United States Patent [19]

Friedmann et al.

[11] Patent Number: 5,377,796
[45] Date of Patent: Jan. 3, 1995

[54] APPARATUS FOR TRANSMITTING FORCE BETWEEN ROTARY DRIVING AND DRIVEN UNITS

[75] Inventors: Oswald Friedmann, Lichtenau; Johann Jäckel, Baden-Baden, both of Germany

[73] Assignee: Luk Lamellen und Kupplungsbau GmbH, Bühl, Germany

[21] Appl. No.: 881,994

[22] Filed: May 1, 1992

[30] Foreign Application Priority Data

May 2, 1991 [DE] Germany .............................. 4114321

[51] Int. Cl.6 .............................................. F16D 3/14
[52] U.S. Cl. ...................................... 192/3.29; 192/3.3; 192/106.2; 74/574; 464/68
[58] Field of Search ...................... 192/3.28, 3.29, 3.3, 192/106.1, 106.2; 464/67, 68; 74/574

[56] References Cited

U.S. PATENT DOCUMENTS

| | | | |
|---|---|---|---|
| 4,138,003 | 2/1979 | Malloy | 192/3.29 |
| 4,785,924 | 11/1988 | Jäckel | 192/3.29 |
| 4,867,290 | 9/1989 | Macdonald et al. | 192/3.28 |
| 4,986,398 | 1/1991 | Olsen | 192/3.28 |
| 4,987,980 | 1/1991 | Fujimoto | 192/3.28 |
| 5,042,632 | 8/1991 | Jäckel | 464/68 X |
| 5,065,853 | 11/1991 | Fujimoto et al. | 192/3.29 |
| 5,080,215 | 1/1992 | Forster et al. | 192/106.2 |
| 5,105,921 | 4/1992 | Fujimoto | 192/106.2 X |
| 5,125,872 | 6/1992 | Reik | 464/67 |
| 5,141,474 | 8/1992 | Fujimoto | 464/67 |
| 5,146,811 | 9/1992 | Jackel | 74/574 |
| 5,156,249 | 10/1992 | Friedmann | 74/574 X |

Primary Examiner—Andrea L. Pitts
Attorney, Agent, or Firm—Darby & Darby

[57] ABSTRACT

An apparatus which serves to transmit force between the crankshaft of an internal combustion engine and the input shaft of a variable-speed transmission in a motor vehicle has a hydraulic clutch with one or more pumps, stators and turbines. The casing of the hydraulic clutch is driven by the crankshaft, and the turbine(s) drives or drive a hub which transmits torque to the input shaft. One or more elastic dampers are installed in the casing to permit pronounced angular movements (within preselected limits) of the casing and the hub relative to each other. Each damper comprises energy storing elements, e.g., arcuate coil springs, acting at least in the circumferential direction of the casing. A lock-up clutch can be installed in the casing in series with the damper or dampers.

79 Claims, 13 Drawing Sheets

5,377,796

APPARATUS FOR TRANSMITTING FORCE BETWEEN ROTARY DRIVING AND DRIVEN UNITS

BACKGROUND OF THE INVENTION

The invention relates to force transmitting apparatus in general, and more particularly to improvements in apparatus for transmitting force between a rotary driving unit (such as the engine of a motor vehicle) and a rotary driven unit (such as the variable-speed transmission in the motor vehicle). Still more particularly, the invention relates to improvements in force transmitting apparatus which employ hydraulic clutches of the type known as Föttinger couplings and hydrodynamic torque converters.

Hydraulic clutches of the type capable of being utilized in the apparatus of the present invention normally comprise a rotary pump which receives torque from the driving unit, and a turbine which is rotated by the pump and transmits torque to the driven unit. Such clutches can further comprise one or more stators or guide wheels between the pump and the turbine.

OBJECTS OF THE INVENTION

An object of the invention is to provide an apparatus of the above outlined character which can furnish a superior damping action.

Another object of the invention is to provide an apparatus which permits extensive movements of the driving and driven units relative to each other.

A further object of the invention is to provide an apparatus which can transmit large forces in a predictable and controllable manner.

An additional object of the invention is to provide the apparatus with one or more improved dampers.

Still another object of the invention is to provide the apparatus with a novel and improved lock-up clutch.

A further object of the invention is to provide the apparatus with a novel and improved combination of a lock-up clutch and one or more elastic dampers.

Another object of the invention is to provide the apparatus with a novel and improved combination of a hydraulic clutch and one or more dampers.

An additional object of the invention is to provide the apparatus with a novel and improved combination of a hydraulic clutch, a lock-up clutch and one or more elastic dampers.

Still another object of the invention is to provide a novel and improved distribution of the above outlined components in a casing which receives torque from the driving unit, e.g., from the crankshaft of an internal combustion engine in a motor vehicle.

A further object of the invention is to provide a simple and compact apparatus which can be assembled in a time-saving manner and is constructed and assembled in such a way that the wear upon its sensitive parts is reduced to ensure long useful life and disturbance-free operation.

An additional object of the invention is to provide an apparatus which can be assembled from a relatively small number of simple and inexpensive, particularly mass-produced, components.

Another object of the invention is to provide an apparatus which can be installed in existing motor vehicles.

SUMMARY OF THE INVENTION

The invention is embodied in an apparatus for transmitting force from a rotary driving unit to a rotary driven unit, e.g., from the engine to the variable-speed transmission of a motor vehicle. The improved apparatus comprises at least one rotary casing which is connectable with the driving unit; and means for transmitting torque between the at least one casing and the driven unit. The torque transmitting means comprises a rotary hub which is connectable with the driven unit, at least one pump, at least one turbine and damper means including at least one elastic damper between the at least one casing and the hub. The at least one casing has a substantially axially extending confining portion, and the at least one damper comprises a plurality of energy storing elements acting at least in the circumferential direction of the at least one casing. The energy storing elements are at least partially surrounded by and bear against the confining portion of the at least one casing under the action of centrifugal force in response to rotation of the at least one casing. The at least one pump is driven by the at least one casing, and the at least one turbine is non-rotatably connected with the hub. The torque transmitting means can further comprise at least one stator between the at least one pump and the at least one turbine.

The at least one damper preferably employs energy storing elements which are elongated in the circumferential direction of the confining portion.

The input member of the at least one damper can form part of the at least one casing. Such input member can include integral abutments on the at least one casing. The abutments can constitute deformed portions of the at least one casing; to this end, that section or portion or shell of the casing which is provided with the abutments can be made of a ductile metallic or other suitable material.

The energy storing elements of the at least one damper can constitute or include elongated springs having a circular cross-sectional outline. The length of each spring can be between 6 and 20 times the diameter of the respective spring, preferably between 8 and 14 times the diameter of the respective spring. Each spring can extend circumferentially of the confining portion of the at least one casing along an arc of between 90° and 175°.

The energy storing elements of the at least one damper can include preformed arcuate springs, and each such preformed spring can be shaped to retain its arcuate form within and outside of the confining portion. In other words, it is not necessary to impart to the springs an arcuate shape during insertion into the at least one casing. The arrangement may be such that the springs receive their final shape in the plant or are preshaped in the plant in such a way that it is merely necessary to slightly alter their shape, or that no changes of shape are needed, prior to actual installation in the at least one casing of the improved apparatus.

The confining portion of the at least one casing can comprise an outer section (which can constitute an integral cylindrical or nearly cylindrical part of a metallic shell of the at least one casing) and a liner between the outer section and the energy storing elements of the at least one damper. The liner can include at least one insert which extends circumferentially of the confining portion adjacent one of the energy storing elements.

As mentioned above, the confining portion can extend substantially axially of the at least one casing, and the at least one damper further comprises an input member having abutments which engage the energy storing elements and are provided on the confining portion. At least some of these abutments can be affixed to the confining portion. The abutments can also include abutments which are integral with the at least one casing and alternate with the energy storing elements of the at least one damper in the circumferential direction of the confining portion. The input member of the at least one damper can include an annular component, and at least some of the abutments can include deformed portions which form part of the annular component and alternate with the energy storing elements in the circumferential direction of the confining portion. Such apparatus can further comprise means (e.g., welded joints) for bonding the annular component to the confining portion of the at least one casing. The annular component and the at least one casing can define an annular chamber for the energy storing elements of the at least one clamper.

The at least one damper comprises an output member which can include an at least substantially disc-shaped component having outwardly extending projections (e.g., in the form of arms) which engage the energy storing elements. The projections (such as the aforementioned arms) alternate with the energy storing elements in the circumferential direction of the confining portion.

The torque transmitting means of the improved apparatus preferably further comprises a lock-up clutch which is installed in series with the at least one damper. The output member of the at least one damper can constitute the input member of the lock-up clutch.

In accordance with one presently preferred embodiment, the lock-up clutch comprises an input member and two substantially disc-shaped output members (i.e., an output member having two discs) which flank the input member. At least one of the output members is movable toward and away from the other output member to thereby respectively engage and disengage the lock-up clutch. The output members preferably define an at least substantially annular compartment which is at least substantially sealed in engaged condition of the clutch. At least one of the output members can include means for centering the input member of the lock-up clutch. The input member can comprise at least one friction lining which is contacted by at least one of the output members in engaged condition of the clutch. Such clutch can further comprise a supply of oil or another suitable-hydraulic fluid which is confined in the compartment in engaged condition of the clutch and is free to flow into and from the compartment along the at least one lining in disengaged condition of the clutch. One of the output members can form part of the at least one turbine, e.g., such one output member can form an integral part of the housing of the at least one turbine. Alternatively, the apparatus can comprise means for connecting one of the output members to the at least one turbine.

At least one output member of the lock-up clutch can constitute a reciprocable piston or plunger. Alternatively, each output member of the lock-up clutch can constitute a reciprocable piston or plunger. Each such reciprocable piston or plunger can sealingly engage the hub.

The output member or members of the lock-up clutch can be installed between a substantially radially extending part of the casing and the at least one turbine.

In accordance with a presently preferred embodiment, the lock-up clutch has at least one input member which is connected with or constitutes the output member of the at least one damper, two substantially disc-shaped output members which define an annular fluid-containing compartment for the input member or members, and means for non-rotatably connecting at least one of the output members with the hub. Furthermore, such apparatus can comprise means (e.g., mating threads or like configurations) for non-rotatably connecting the other output member of the lock-up clutch to the hub, and at least one of the two output members is movable axially of the hub. As already mentioned above, the apparatus can be constructed in such a way that each of the two output members of the lock-up clutch is movable axially of the driven unit.

If the lock-up clutch comprises a plurality of substantially disc-shaped or lamellar output members, the apparatus further comprises means for preventing rotation of the output members relative to each other (such rotation preventing means can include the aforementioned hub and/or other means, e.g., rivets and/or washers which couple the output members to each other, if necessary with freedom of movement axially of the driven unit). A presently preferred device for coupling the output members to each other is designed to permit limited freedom of axial movement of at least one output member relative to at least one other output member of the lock-up clutch. Such coupling device can be designed to connect the output members to each other by snap action. For example, the coupling means can comprise a bayonet mount.

The input means of the lock-up clutch can receive torque (directly or indirectly) from the at least one damper.

If the damper means comprises a plurality of elastic dampers, the lock-up clutch of the torque transmitting means is preferably installed to operate in series with the dampers. The dampers can include the at least one damper whose output means transmits torque to the clutch, and a second damper having input means receiving torque from the clutch.

In order to enhance the compactness of the apparatus, one output member of the lock-up clutch can be installed in such a way that it is adjacent the at least one turbine and another output member of the clutch can be installed between the one output member and a substantially radially extending part of the casing which is adjacent the driving unit. The at least one damper, or a second damper, of the damper means is then installed between the substantially radially extending part of the casing and the other output member of the clutch.

The lock-up clutch can be constructed in such a way that its input means comprises two substantially disc-shaped input members and its output means includes a lamella (e.g., in the form of a ring) adjacent one of the input members. Such clutch further comprises means for biasing the lamella and the one input member against each other to thus engage the clutch. The biasing means can comprise two second disc-shaped members at least one of which is movable axially of the hub toward and away from the other second disc-shaped member. The second disc-shaped members define an annular fluid-receiving compartment for the lamella and the one input member. Means can be provided to connect the lamella with one of the second disc-shaped members. Such apparatus can further comprise means for non-rotatably connecting the input members of the clutch to each other with predetermined freedom of axial movement relative to one another.

The input member or members of the lock-up clutch can be provided with abutments (e.g., in the form of projections) for the energy storing elements of the at least one damper or for the energy storing means of a second elastic damper of the damper means.

If the lock-up clutch comprises at least one substantially disc-shaped input member and two substantially disc-shaped output members defining an annular fluid-containing compartment for the at least one input member, one of the output members can be provided with means for centering the at least one input member.

The at least one damper can comprise input means connected with the casing and output means connected with the pump.

The pump can comprise a plurality of sections and the at least one damper can comprise input means connected with one of the sections and output means connected with another section of the pump. The energy storing elements of such at least one damper can be installed in prestressed condition, The sections of the composite pump include first housings and the at least one turbine has a second housing. These housings jointly define an annular chamber for the at least one damper.

The at least one pump can comprise a first and a second section, and the damper means can include a second elastic damper having input means connected with the first section and output means connected with the second section of such pump, The second damper is then disposed in an annular chamber which is defined by the housings of the first and second sections of the at least one pump and by the housing of the at least one turbine. The aforementioned lock-up clutch then serves to force-lockingly connect one section of the at least one pump with the driven unit.

Another feature of the invention resides in the provision of an apparatus for transmitting force from a rotary driving unit to a rotary driven unit, particularly from the engine to the input shaft of a transmission in a motor vehicle. The apparatus comprises at least one elastic damper and a lock-up clutch in series with the at least one damper.

A further feature of the invention resides in the provision of an apparatus for transmitting force from a rotary driving unit to a rotary driven unit. The apparatus comprises a lock-up clutch having two coaxial rotary output members which define an annular fluid-containing compartment. At least one of these output members is movable axially toward and away from the other output member, and the lock-up clutch further comprises a rotary input member which is disposed between the output members. The input and output members cooperate to seal the annular compartment in response to movement of the at least one output member toward the other output member.

An additional feature of the invention resides in the provision of an apparatus for transmitting force from a rotary driving unit to a rotary driven unit. The apparatus comprises at least one elastic damper having input means driven by the driving unit and output means, and the apparatus further comprises a lock-up clutch which receives torque from the output means of the at least one damper.

Still another feature of the present invention resides in the provision of an apparatus for transmitting force from a rotary casing to a rotary driven unit. Such apparatus comprises a hydraulic clutch having a pump, and an elastic damper between the casing and the pump.

A further feature of the invention resides in the provision of an apparatus for transmitting force from a rotary driving unit to a rotary driven unit. The apparatus comprises a hydraulic clutch including a pump having a first section and a second section, and an elastic damper between the first and second sections of the pump.

Another feature of the invention resides in the provision of an apparatus for transmitting force from a rotary driving unit to a rotary driven unit. The apparatus comprises a hydraulic clutch including a composite pump having a first rotary section and a coaxial second rotary section, a lock-up clutch, and an elastic damper which connects one of the sections with the lock-up clutch.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
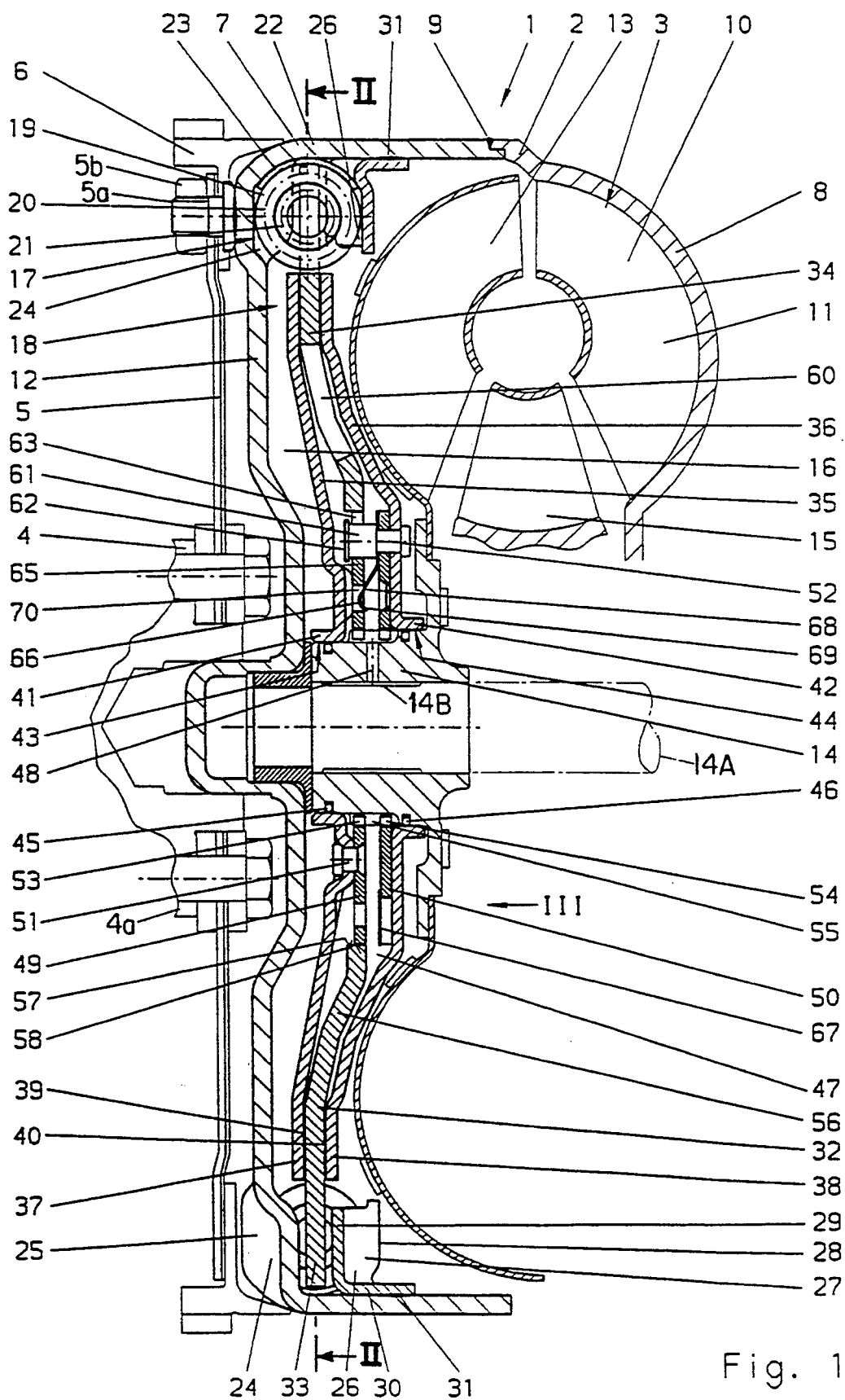
FIG. 1 is an axial sectional view of an apparatus which embodies one form of the invention and comprises a single damper in series with a lock-up clutch.
Figure 2:
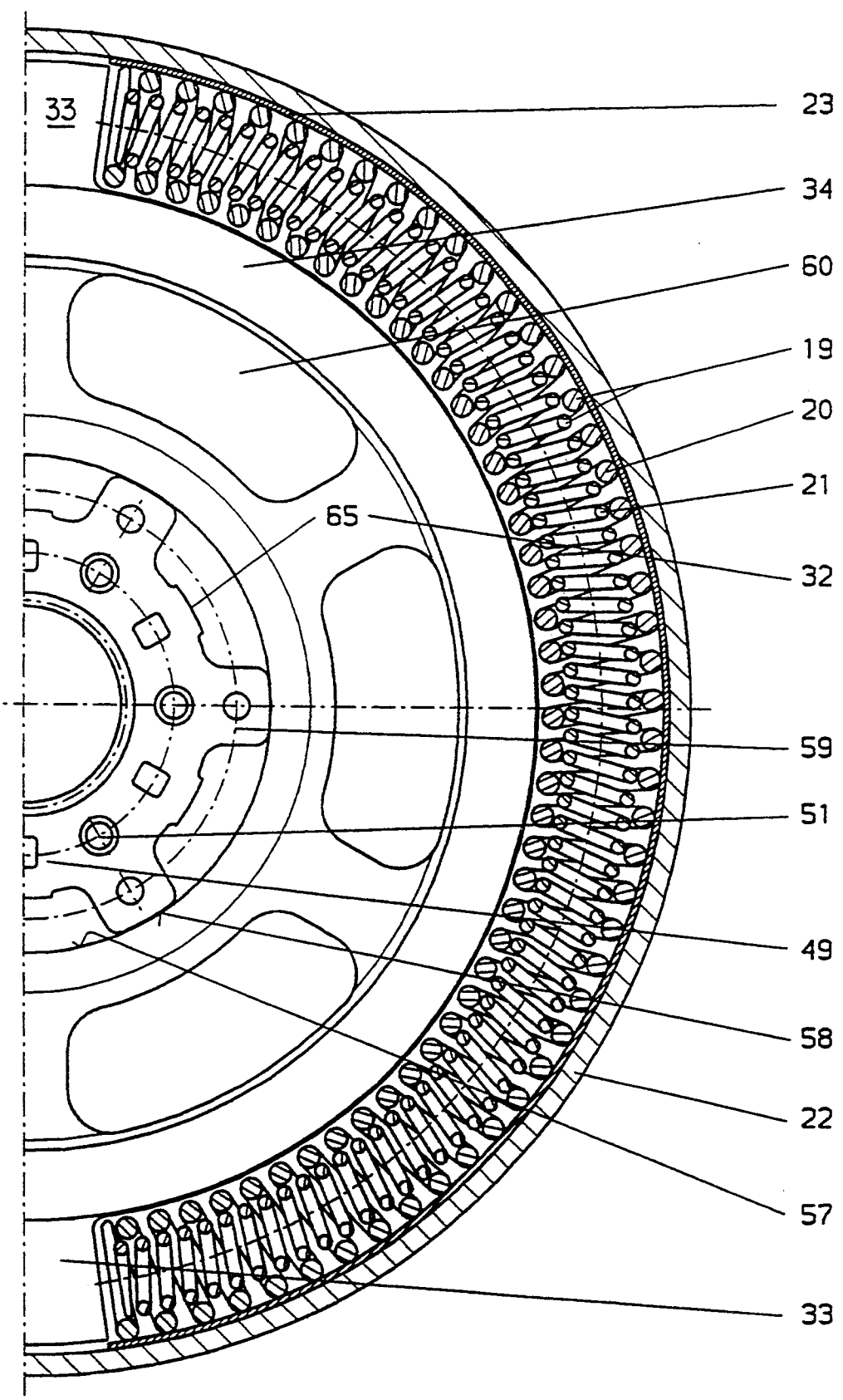
FIG. 2 is an enlarged fragmentary transverse sectional view substantially as seen in the direction of arrows from the line II—II in FIG. 1.
Figure 3:
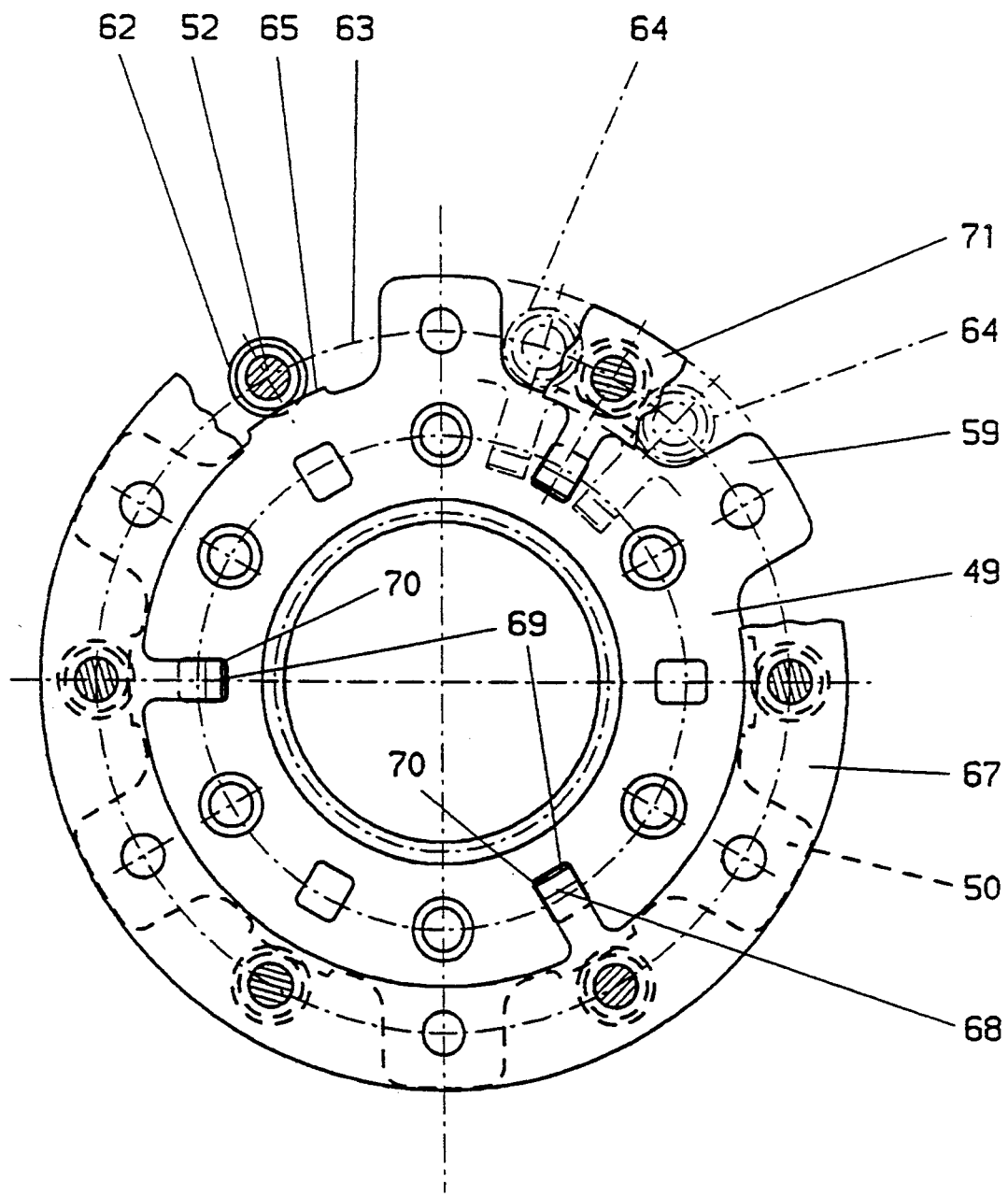
FIG. 3 is an end elevational view of a detail as seen in the direction of arrow III in FIG. 1, with certain parts broken away.

FIGS. 1 to 3 show an apparatus 1 which can be used to transmit force from a rotary driving unit to a rotary driven unit. The driving unit can comprise an internal combustion engine having a rotary output member 4 (e.g., a crankshaft) which is affixed to a rotary torque transmitting element 5 by a number of bolts 4a or other suitable fasteners. The driven unit can comprise a transmission having an input shaft 14A. The illustrated torque transmitting element 5 is a disc having a radially inner portion which is affixed to the output member 4 by the aforementioned fasteners 4a, and a radially outer portion which is affixed (e.g., by bolts 5a and nuts 5b) to a casing or housing 2 of the apparatus 1. The casing 2 carries a starter gear 6.

The casing 2 confines a hydrodynamic torque converter 3 and comprises two main sections or shells 7, 8 which are welded to each other at 9. The shell 7 is nearer to and the shell 8 is more distant from the output member 4. The illustrated welded joint 9 establishes a rigid connection between the two radially outermost parts of the shells 7 and 8. This joint preferably further serves to establish a fluidtight seal between the shells 7 and 8 of the casing 2.

The shell 8 constitutes a component part of a pump 10 which forms part of the torque converter 3 and is driven by the casing 2 in response to rotation of the output member 4. The pump 10 further comprises customary vanes 11 which are rigid with the shell 8, i.e., with the housing of the pump 10.

A turbine 13 of the torque converter 3 is installed between the pump 10 and a radially extending part 12 of the shell 7. This turbine is rigid with a hub 14 which serves to transmit torque to the input shaft 14A of the transmission. To this end, the hub 14 has internal teeth 14B which mate with complementary external teeth of the shaft 14A.

A stator or guide wheel 15 of the torque converter 3 is installed axially between the pump 10 and the turbine 13.

The shells 7, 8 of the casing 2 enclose a space 16 which confines an elastic damper 17 serving to establish a connection between the hub 14 and the element 5, and more particularly between the hub 14 and the shell 7 of the casing 2. The damper 17 permits a certain amount of angular movement between the output member 4 of the engine and the input member 14A of the transmission. In addition to the pump 10, turbine 13, stator 15 and damper 17, the means for transmitting torque between the casing 2 and the output unit including the shaft 14A comprises a lock-up clutch 18. This clutch is connected in series with the damper 17.

The damper 17 comprises arcuate energy storing elements 19 each of which comprises two springs, namely a larger-diameter outer coil spring 20 and a smaller-diameter inner coil spring 21 which is confined in the outer spring 20 (see particularly FIG. 2). The damper 17 of FIGS. 1 and 2 comprises two energy storing elements 19 each of which extends along an arc of little less than 180°. It is presently preferred to employ two or more energy storing elements 19 each of which extends along an arc of between 90° and 170°, and the spacing between the adjacent ends of neighboring energy storing elements 19 may but need not be uniform. It is further preferred to impart to the springs 20, 21 a curvature corresponding to or approximating that which is shown in FIG. 2 prior to insertion of the energy storing elements 19 into the space 16 between the shells 7 and 8 of the casing 2. Such shaping or bending of the springs 20, 21 prior to installation in the casing 2 simplifies the assembly of the damper 17 because it is not necessary to employ specially designed means for maintaining the springs 20, 21 in the illustrated bent or curved condition preparatory to and during installation in the casing 2. Furthermore, preformed springs are stressed exclusively by introduced forces or moments which develop in actual use of the apparatus 1, rather than by non-symmetrical stresses which are attributable to bending of originally straight springs 20, 21 during introduction into the casing 2.

In accordance with a feature of the invention, the casing 2 comprises a radially outermost or radially outer confining portion which opposes radially outward movements of the larger-diameter outer springs 20 under the action of centrifugal force when the output member 4 drives the shells 7 and 8 by way of the torque transmitting element 5. In the apparatus 1 of FIGS. 1 to 3, the confining portion of the casing 2 comprises a cylindrical part or section 22 of the shell 7 between the radially extending part 12 and the shell 8, and a composite liner 23 which is adjacent the internal surface of the cylindrical part 22 and is directly contacted by the radially outer portions of the springs 20.

The liner 23 can be assembled of two or more arcuate sections or inserts (one shown in FIG. 2) each having a concave inner side contacting the adjacent spring or springs 20 and a convex outer side abutting the internal surface of the cylindrical part 22 of the shell 7. The configuration of the inner side of each section or insert of the liner 23 is preferably such that it rather closely follows the outline(s) of the adjacent portion or portions of one or more neighboring outer springs 20. In other words, it is presently preferred to establish a large-area contact between each section of the liner 23 and the adjacent spring or springs 20. The arrangement may be such that the liner 23 is assembled of n sections, wherein n is the number of energy storing elements 19, and that each section of the liner 23 is outwardly adjacent a discrete spring 20. An advantage of large-area contact between the liner 23 and the springs 20 is that this entails a pronounced reduction (or even practical elimination) of wear upon the springs 20 and/or upon the liner. The liner 23 can be made of a suitable metallic or plastic material.

The input member of the damper 17 includes a plurality of abutments or stops which are carried by the shell 7 of the casing 2. In the damper 17 of FIGS. 1 to 3, the input member comprises two abutments or stops for each energy storing element 19. Such abutments include two abutments 24 which are constituted by deformed (depressed) portions or pockets 25 of the shell 7 and each of which extends between two neighboring ends of the elements 19. The shells 7 and 8 can be made of metallic sheet material or of a plastic sheet material which is sufficiently ductile to facilitate the formation of pockets 25 in available machinery. Each pocket 25 extends between the adjacent ends of the elements 19 in the radial as well as in the axial direction of the cylindrical part 22 of the shell 7. Each of the pockets 25 is formed partially in the cylindrical part 22 and primarily in the radial part 12 of the shell 7.

The input member of the damper 17 comprises two additional abutments or stops 26 each of which has a pocket 27 constituting a mirror image of or resembling a pocket 25. The abutments 26 are integral parts of an annular component 28 of the input member of the damper 7, and the component 28 is bonded to the cylindrical part 22 of the shell 7, as at 31. The component 28 comprises a radially extending portion or leg 29 and an axially extending portion or leg 30 which is welded to the part 22. The abutments 26 constitute deformed portions of the leg 29, and the latter is spaced apart from the radial part 12 of the shell 7. Each abutment 26 extends in the radial and axial directions of the cylindrical part 22 and is received between the adjacent ends of the energy storing elements 19 opposite one of the abutments 24. The annular component 28 which is shown in FIG. 1 has a substantially L-shaped cross-sectional outline; however, it is equally within the purview of the invention to employ an annular component which has a V-shaped, U-shaped or other suitable cross-sectional outline. The outer diameter of the axially extending leg 30 of the annular component 28 closely approximates the inner diameter of the cylindrical part 22 of the shell 7. The welded joints 31 between the component 28 and the shell 7 can be established by resorting to spot welding, resistance welding, laser beam welding or another other suitable bonding technique.

The arcuate sections of the composite liner 23 can be inserted between the abutments 24 and/or 26 so that the annular component 28 of the input member of the damper 17 and the welded joints 31 can perform the additional function of preventing any movements (or excessive movements) of the sections of liner 23 in the circumferential direction of the shell 7. Thus, each abutment 24 and/or 26 can be disposed between the neighboring edge faces of two sections of the liner 23. The component 28 and the section 7 define an annular chamber for the energy storing elements 19 of the damper 17. The innermost portion of such chamber is open.

As can be seen in FIGS. 1 and 2, the outer diameter of the damper 17 (i.e., the outer diameter of the ring which is formed by the outer springs 20 of the energy storing elements 19) practically matches the inner diameter of the cylindrical part 22, i.e., the inner diameter of the radially outermost part of the casing 2. This is desirable and advantageous because the casing 2 can confine a maximum of spring volume and spring capacity. Therefore, each of the energy storing elements 19 can undergo extensive deformation in the circumferential direction of the confining portion 22, 23 of the casing 2 and, accordingly, the hub 14 and the casing 2 can carry out extensive angular movements relative to each other. All this can take place at a relatively low spring rate. The extent of angular movability of the casing 2 and hub 14 relative to each other can be in the range of between 40° and 75° and the realizable twisting or torsional ratio is preferably between 2 and 15 Nm per degree. The above parameters can be achieved by resorting to a single damper, i.e., by utilizing a single set of springs which operate in parallel to each other. It has been found that, in many instances, a highly satisfactory torsional ratio or torsional rigidity of a damper (such as the damper 17) is between 4 and 12 Nm per degree.

The output member of the damper 17 is a substantially disc-shaped component 32 (hereinafter called flange for short) which is provided with outwardly extending projections 33 in the form of radial arms 33. Each of these arms extends between the neighboring ends of the adjacent energy storing elements 19. When the apparatus 1 is idle, i.e., when the elements 19 are not called upon to store energy (or to store additional energy) in response to angular displacement of the casing 2 and hub 14 relative to each other, each arm 33 of the flange 32 is located between the neighboring abutments 24, 26, i.e., between two pockets 25, 27. FIG. 2 shows that the length of the illustrated element 19 in unstressed condition of such element is slightly less than the distance of the arms 33 from each other (as seen in the circumferential direction of the cylindrical part 22 of the shell 7). This renders it possible to turn the casing 2 and the hub 14 relative to each other through a relatively small angle from a starting or neutral position before the illustrated element 19 begins to store energy or begins to store additional energy. The same preferably holds true for the other energy storing element or elements 19 which is (are) not shown in FIG. 2.

The flange 32 comprises a circumferentially complete ring-shaped portion 34 which is inwardly adjacent the elements 19 and can be clamped between two disc-shaped output members 35, 36 of a composite (multiple-disc) output member of the clutch 18. The flange 32 constitutes the input member of this clutch. Each of the disc-shaped output members 35, 36 can be said to constitute a piston or plunger which is reciprocable, within limits, in the axial direction of the apparatus 1 to engage the clutch 18 in response to movement into frictional contact with the ring-shaped portion 34 of the flange 32, and to disengage or release the clutch 18 in response to movement away from the respective side of the flange 32.

The output members 35, 36 (hereinafter called discs for short) have radially outer portions 37, 38 which can move into and from frictional engagement with the adjacent friction linings 39, 40 at the respective sides of the ring-shaped portion 34 of the flange 32. It is clear that the linings 39, 40 can be provided on the radially outer portions 37, 38 of the respective discs 35, 36. The radially inner portions 41, 42 of the discs 35, 36 constitute or resemble relatively short cylindrical sleeves which are reciprocable on the adjacent portions 43, 44 of the peripheral surface of the hub 14. The portions 43, 44 of the peripheral surface of the hub 14 serve as a means for accurately centering the respective discs 35, 36. These portions 43, 44 are provided with circumferentially complete grooves for sealing elements in the form of O-rings 45 and 46 which are respectively surrounded by the sleeves 42, 43 so that the liquid-containing annular compartment 47 between the discs 35, 36 is sealed from the surrounding atmosphere when the discs (pistons) 35 and 36 are caused to move toward each other to thereby engage the clutch 18 by moving into frictional engagement with the adjacent friction linings 39 and 40. In order to disengage the clutch 18, a radial bore or channel 48 in the hub 14 is caused to admit a pressurized hydraulic fluid into the annular compartment 47 so that the discs 35, 36 are moved away from the respective sides of the flange 32 (i.e., the flange 32 can slip relative to the discs 35, 36 and/or vice versa) and the hydraulic fluid can leave the compartment 47 by flowing radially between the respective sides of the ring-shaped portion 34 and the adjacent radially outer portions 37, 38 of the discs 35, 36, i.e., along the friction linings 39 and 40. The radially outer end of the bore 48 communicates with the compartment 47 between the O-rings 45, 46, i.e., between the portions 43, 44 of the peripheral surface of the hub 14 (as seen in the axial direction of the hub). The hydraulic fluid is or can be oil.

Engagement of the clutch 18 is effected by pressurized hydraulic fluid (such as oil) which is confined in the internal space 16 of the casing 2 and acts upon the outer sides of the discs 35 and 36, i.e., upon those sides of the discs (pistons) which face away from the flange 32.

The parts which transmit torque between the discs 35, 36 (output member of the clutch 18) and the hub 14 comprise two washers 49, 50 which are riveted to the respective discs, as at 51 and 52. The washers 49, 50 are located at those (inner) sides of the respective discs 35, 36 which face the flange 32, i.e., they are located in the annular compartment 47. The radially innermost portions of the washers 49, 50 are profiled (preferably toothed) at 53, 54 to non-rotatably engage complementary external profiles (such as teeth) 55 of the hub 14 between the cylindrical portions 43, 44 of the peripheral surface of the hub. The washers 49, 50 and the teeth 53, 55 prevent rotation of the discs 35, 36 relative to each other.

The diameter of the portion 44 of the peripheral surface of the hub 14 exceeds the diameter of the portion 43. This reduces the likelihood of improper mounting the discs 35, 36 on the hub 14.

The washer 49 (i.e., the disc 35 which is secured to the washer 49 by rivets 51) performs the additional function of centering the flange 32 on the hub 14. To this end, the flange 32 comprises a radially inner portion 56 which is located in the compartment 47 and extends radially inwardly toward the washer 49. The internal surface 57 of the portion 56 is a short cylinder which engages and surrounds a complementary cylindrical external surface 58 of the washer 49. The surface 58 is a composite surface which is defined by the radially outermost portions or arms 59 of the washer 49 (see particularly FIG. 2). The portion 56 of the flange 32 has an annulus of cutouts 60 which permit the hydraulic fluid to flow in the compartment 47 between the opposite sides of the flange.

An advantage of the output member including the two piston-like discs 35, 36 is that the clutch 18 can comprise several pairs of cooperating friction surfaces. One such pair is established by the radially outer portion 37 of the disc 35 in cooperation with the friction lining 39, and the other pair is established by the radially outer portion 38 of the disc 36 in cooperation with the friction lining 40. Consequently, one can operate with a hydraulic fluid which need not be highly pressurized in order to maintain the discs 35, 36 in requisite frictional engagement with the linings 39, 40 and to thus maintain the clutch 18 in engaged condition. It follows that a relatively low pressure of fluid in the compartment 47 suffices to disengage the clutch 18.

The improved clutch 18 can be utilized with equal or similar advantage in apparatus which do not employ one or more elastic dampers.

It is within the purview of the invention to further increase the number of pairs of surfaces which are in frictional contact with each other when the clutch 18 is engaged. For example, the flange 32 can carry two or more discs which are non-rotatably but axially movably affixed thereto and alternate with discs which are axially movably but non-rotatably secured to the disc 35 and/or 36. This would merely amount to a multiplication of the torque transmitting and torque receiving discs not unlike in a conventional multiple-disc clutch.

The provision of two piston-like discs (35, 36) is particularly desirable and advantageous if the number of frictionally engageable surfaces between the input and output means of the lock-up clutch 18 is to be increased. Depending upon the intended use of the apparatus 1, the thus achievable increase of pairs of cooperating frictionally engageable surfaces can be relied upon to increase the transmitted torque or to reduce that pressure which must be applied to the outer sides of the discs 35, 36 in order to engage or close the clutch 18. This renders it possible to minimize the loss of power.

FIG. 1 shows that the discs 35, 36 are disposed between the radially extending part 12 of the shell 7 and the turbine 13. The hub 14 and the teeth 53, 55 constitute means for non-rotatably connecting the discs 35, 36 with the turbine 13, i.e., with the driven unit of the apparatus 1.

FIG. 1 further shows that the annular compartment 47 is formed by the discs 35, 36 without necessitating an increase in the radial and/or axial dimensions of the housing 2.

The discs 35, 36 are coupled to each other by snap action so that they share all angular movements but are free to move axially toward and away from each other. The coupling which is used in the apparatus of FIGS. 1 to 3 is a bayonet mount which is installed between the washers 49 and 50. This bayonet mount comprises a cylindrical extension 61 on each rivet 52, and each extension 61 has a free end or head 62 which constitutes a first detent member. The washer 49 has radial cutouts 63 (see particularly FIG. 3) which permit passage of the heads 62 in certain angular positions of the washers 49, 50 (i.e., discs 35, 36) relative to each other. Two such angular positions are indicated in FIG. 3 by phantom lines, as at 64. FIG. 3 further shows that the positions of the parts 49, 50, relative to each other are selected with a view to ensure the establishment of several angular positions in each of which the heads 62 of the extensions 61 can pass through the adjacent cutouts 63. The washer 49 is further provided with undercut detent members 65 which are engaged by the adjacent detent members or heads 62 in response to angular displacement of the washers 49, 50 relative to each other (such angular displacement follows an axial movement involving passage of heads 62 through the adjacent cutouts 63). The detent members 65 of the washer 49 are radial projections which cooperate with the detent members or heads 62 to prevent axial movements of the washers 49, 50 relative to each other. As can be seen in FIG. 3, the detent members 65 are obtained as a result of appropriate shaping of the respective cutouts 63 which alternate with the projections 59 of the washer 49.

The coupling between the washers 49, 50 further comprises one or more resilient elements 66 which tend to move the discs 35, 36 axially and away from each other. The illustrated resilient element 66 includes a dished spring 67 which is installed axially between the washer 50 and the extensions 61 of the rivets 52. The radially inner portion of the dished spring 67 is provided with radially inwardly extending axially resilient protuberances in the form of fingers 68. The fingers 68 are bent in the axial direction of the washers 49, 50 and are stressed when they assume the positions of FIG. 1 so that they urge the discs 35 and 36 axially and away from each other. The fingers 68 further serve as a means for preventing angular movements of the discs 35, 36 relative to each other when the coupling or bayonet mount including the detent members or heads 62 and the detent members 65 is operative. To this end, the end portions 69 of the fingers 68 are received by snap action in the recesses or cutouts 70 of the washer 49. The end portions 69 of the fingers 68 can enter the adjacent recesses or cutouts 70 only when the detent members 62 engage the adjacent detent members 65. The angle which must be covered in order to activate the bayonet mount (i.e., to limit the extent of axial movability of the discs 35, 36 relative to each other) is shown at 71 (see FIG. 3).

An advantage of the coupling including the aforedescribed bayonet mount is that the discs 35, 36 can be properly assembled prior to insertion into the casing 2, i.e., these discs can be inserted as a preassembled unit or module. This simplifies and shortens the assembly of the apparatus 1 and ensures that the discs 35, 36 are invariably in optimum positions relative to each other, i.e., they are held against excessive axial movement relative to each other and are held against angular movement relative to one another. Such advantages can be achieved regardless of whether the coupling includes a bayonet mount or another suitable coupling. This will be described in greater detail with reference to the embodiment which is shown in FIGS. 4 and 5.

Figure 4:
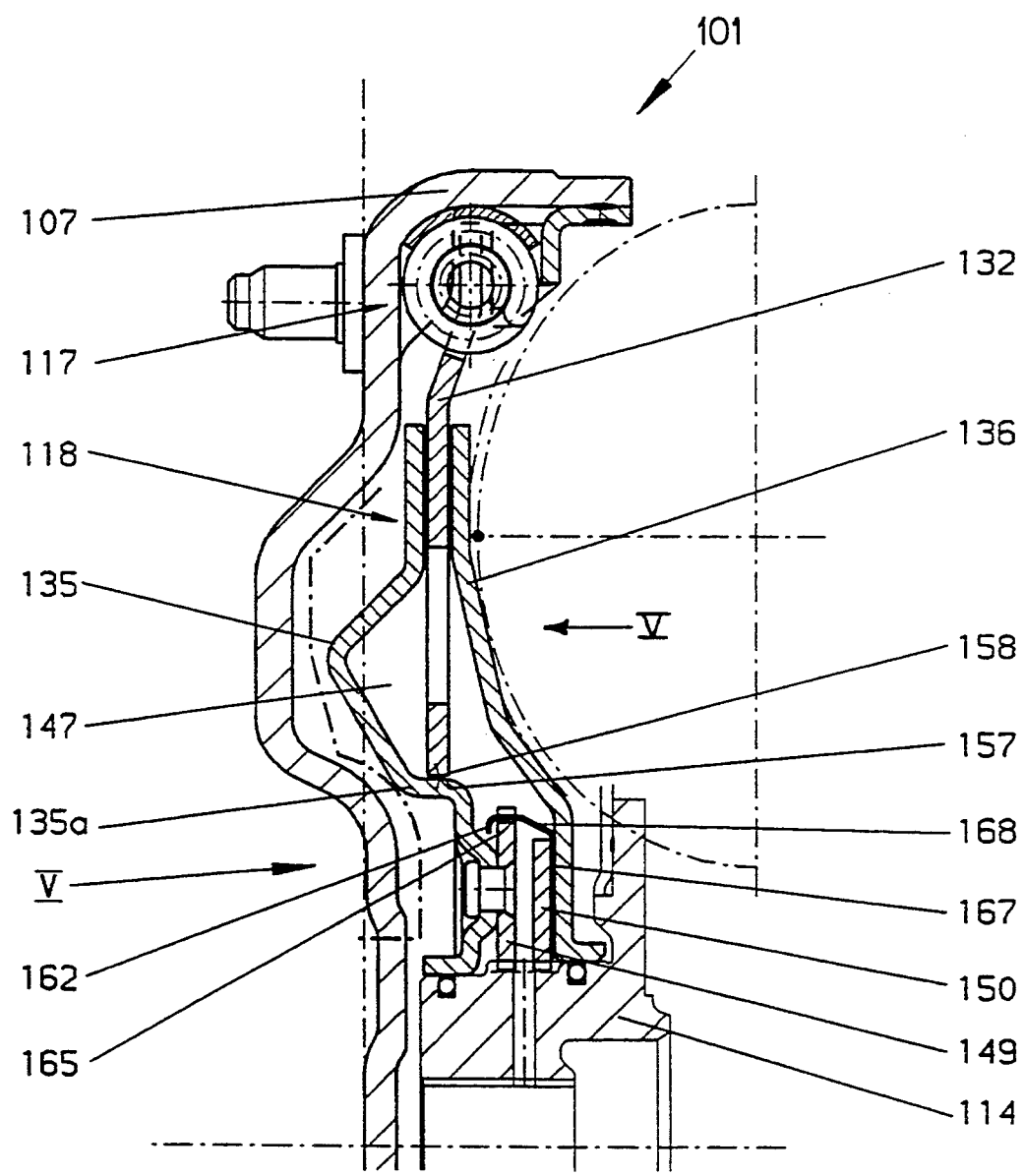
FIG. 4 is a fragmentary axial sectional view of a second apparatus, with a portion of the hydraulic clutch indicated by phantom lines.
Figure 5:
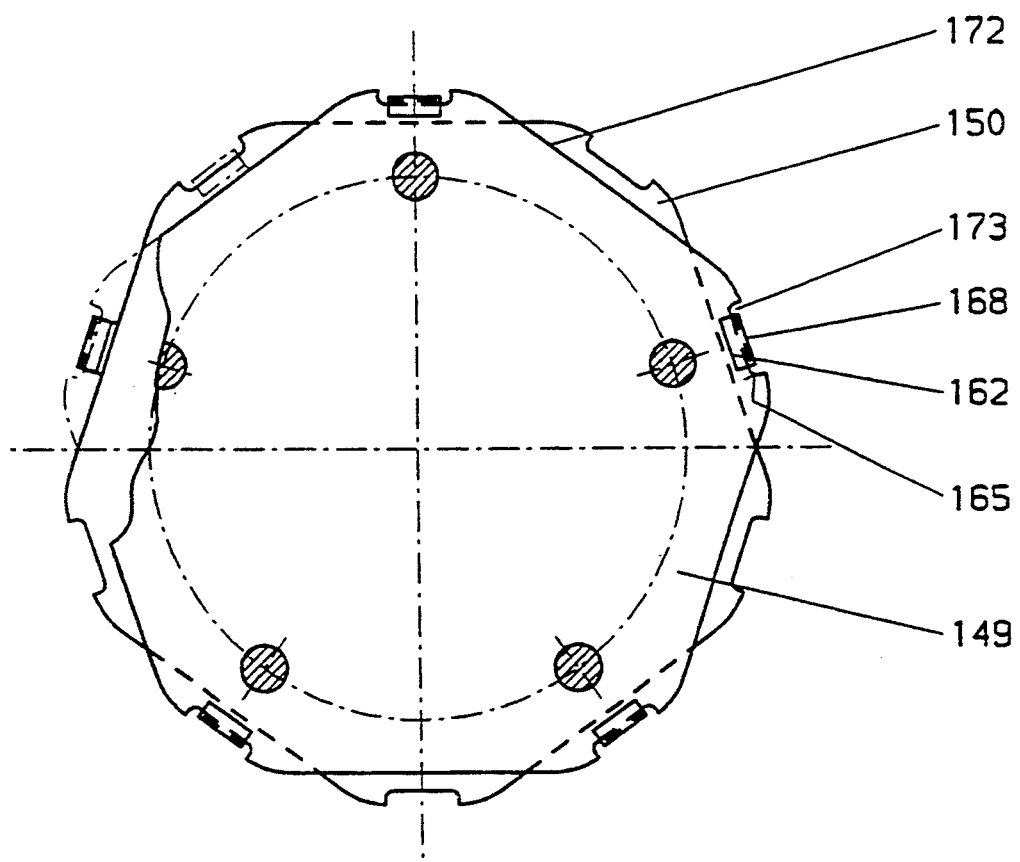
FIG. 5 illustrates a detail as seen in the direction of arrow V in FIG. 4.

FIGS. 4 and 5 show a portion of a modified apparatus 101 which, in many respects, is similar to the apparatus 1 of FIGS. 1 to 3. The apparatus 101 comprises a damper 117 having an output member or flange 132 which constitutes the input member of a lock-up clutch 118. The output member of the clutch 118 comprises two discs 135, 136, and the discs 135 includes a substantially cylindrical intermediate portion 135a which serves as a means for centering the flange 132. To this end, the external surface 158 of the intermediate portion 135a is engaged by the cylindrical internal surface 157 of the radially inner portion of the flange 132. The disc 135 is adjacent and the disc 136 is remote from the radially extending part of the shell 107.

The structure which is shown in FIG. 4 can be modified by installing a centering ring or sleeve (not shown) between the internal surface 157 of the flange 132 and the external surface 158 of intermediate portion 135a of the disc 135.

The coupling between the discs 135, 136 comprises a bayonet mount which maintains the discs in a predetermined angular position relative to each other but permits limited axial movements of at least one of these discs toward and away from the other disc. Such coupling comprises an annular component 167 which is installed axially between the disc 136 and a washer 150. The latter is non-rotatably secured to the disc 135, and the radially inner portion of the annular component 167 is clamped between the parts 135 and 150. The radially outer portion of the component 167 includes axially extending protuberances or fingers 168 which are resilient in the radial direction. The free end portions 162 of the fingers 168 are bent radially inwardly to constitute detent members which cooperate with complementary detent members 165 of a washer 149. The latter is non-rotatably affixed to the inner side of the disc 135, namely to that side which confronts the disc 136 and washer 150. The detent members 162 can engage the adjacent detent members 165 in at least one predetermined angular position of the washers 149, 150 and discs 135, 136 relative to each other.

When the clutch 118 is engaged, the detent members 165 are axially spaced apart a predetermined distance from the adjacent detent members 162. This distance corresponds to the extent of axial movability of the discs 135, 136 relative to each other, i.e., to the distance of the discs 135, 136 from each other when the clutch 118 is disengaged.

FIG. 5 shows that the washer 149 is identical with the washer 150 but that these washers are angularly offset relative to each other when the coupling or bayonet mount including the detent members 162, 165 is operative to couple the discs 135, 136 to each other. At such time, the fingers 168 extend into radial recesses or cutouts 173 at the corners of the washer 149. Locking of the washers 149, 150 to each other is effected in the following way: The first step includes orienting the washers 149, 150 relative to each other in such a way that the fingers 168 can be pushed over central portions of the sides 172 of the washer 149. In other words, the major part of the component 167 is then located at one side but the and portions or detent members 162 of its fingers 168 are located at the other side of the washer 149. The next step involves turning of the washers 149, 150 relative to each other until the fingers 168 snap into the oncoming recesses or cutouts 173 at the corners of the disc 149. This prevents further angular displacement of the washers 149, 150 relative to each other. At the same time, each detent member 162 overlies the central portion of the adjacent detent member 165. The engagement between the fingers 168 and the edge faces surrounding the recesses or cutouts 173 is such that the washers 149, 150 (and hence the discs 135, 136) are held against angular movement relative to each other while being free to move axially toward or away from one another (to the extent determined by the detent member 162 in cooperation with the adjacent detent members 165). The detent members 162 extend radially inwardly beyond the respective recesses or cutouts 173.

The apparatus 101 which includes the structure of FIGS. 4 and 5 can be modified in a number of additional ways. For example, the coupling between the discs 135, 136 can be designed in such a way that it constitutes an axially operating snap-in plug-in coupling. All that is necessary is to provide the free end portions of the fingers 168 and/or the surfaces bounding the recesses or cutouts 173 with suitably inclined ramps which ensure that, during a certain stage of axial movement of the discs 135, 136 and their washers 149, 150 toward each other, the fingers 168 are first flexed radially outwardly to thereupon snap behind the detent members 165 when the assembly of the washers and discs is completed. The aforementioned ramps can be obtained in a very simple and inexpensive way by orienting the detent members 162 at the free ends of the fingers 168 in such a manner that each detent member 162 is bent over through an angle of more than 90° so that it extends radially inwardly and toward the washer 150 (as viewed in FIG. 4), i.e., toward that disc (136) which is non-rotatably connected with the washer 150.

The character 147 denotes the annular compartment between the discs 135, 136.

An advantage which is shared by the apparatus 1 and 101 of FIGS. 1–3 and 4–5 is that the aforediscussed couplings between the discs 35, 36 and 135, 136 facilitate and simplify the installation of such parts. Thus, these couplings ensure that the teeth and/or other profiled configurations at the radially innermost portions of the washers 49, 50 and 149, 150 are properly oriented relative to each other (as seen in the axial direction of the assembled discs) for convenient slipping onto the externally profiled (for example, toothed) hub 14 or 149.

Figure 6:
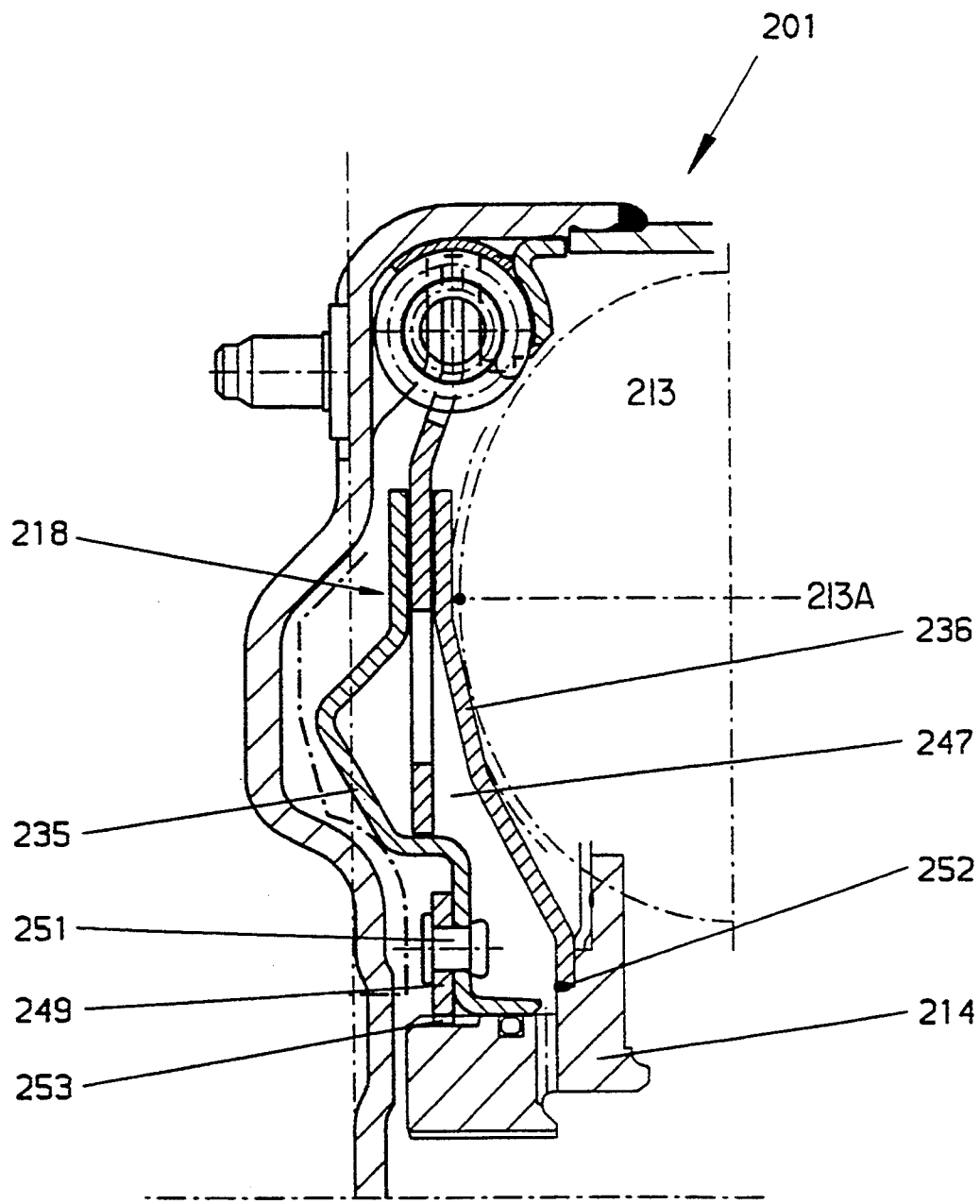
FIG. 6 is a fragmentary axial sectional view of a third apparatus.

The apparatus 201 of FIG. 6 differs from the previously described apparatus 1 and 101 in that its lock-up clutch 218 comprises a single axially movable piston, namely the disc 235. The other disc 236 is welded, at 252, to the hub 214 and cooperates with the disc 235 to define an annular compartment 247 which is sealed when the clutch 218 is engaged and is filled with a hydraulic fluid. In lieu of or in addition to being welded to the hub 214, the radially inner portion or another portion of the disc 236 can be welded or otherwise non-rotatably secured to the housing of the turbine 213, as at 213A.

The means for non-rotatably but axially movably connecting the piston or disc 235 with the hub 214 comprises a washer 249 which is riveted (at 251) to the radially inner portion of the disc 235 and has an annulus of internal teeth 253 or analogous profiled portions which mate with complementary profiled portions (e.g., teeth) at the exterior of the hub 214. The washer 249 is mounted at that side of the disc 235 which faces away from the washer 236 and annular compartment 247.

In all other respects, the apparatus 201 is or can be identical with or similar to the apparatus 1 or 101.

Figure 7:
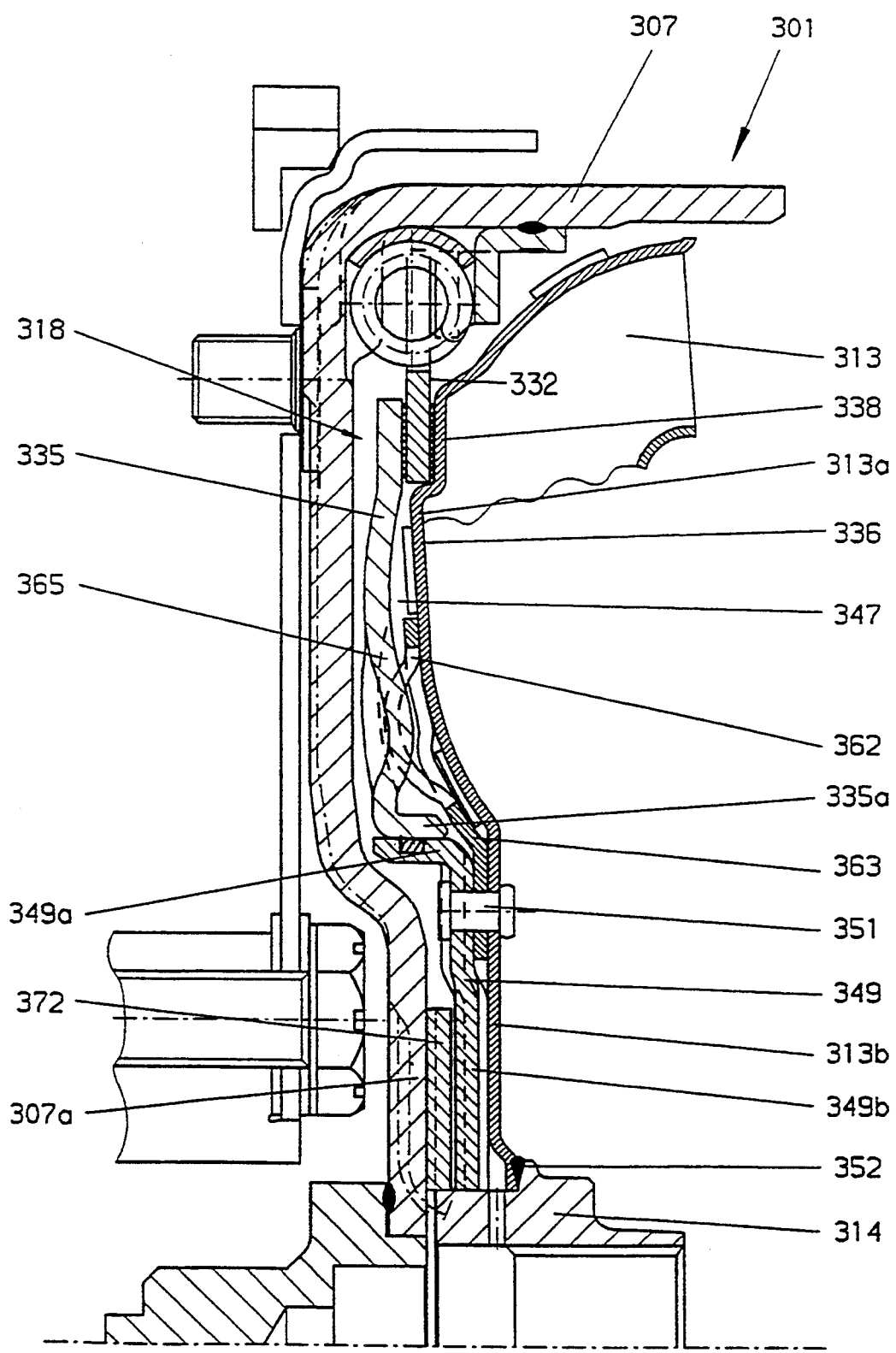
FIG. 7 is a fragmentary axial sectional view of a fourth apparatus wherein the housing of the turbine of the hydraulic clutch forms part of the output means of the lock-up clutch.

The apparatus 301 of FIG. 7 also comprises a single axially movable piston or disc 335. The other disc 336 (which defines with the disc 335 an annular compartment 347) forms part of the housing 313a of the turbine 313. The housing 313a comprises an annular portion 338 which is frictionally engaged by the flange 332 when the clutch 318 is engaged as a result of axial movement of the disc 335 to its right-hand end position (as viewed in FIG. 7). The radially inner portion 313b of the housing 313a is welded (at 352) to the hub 314. The radially inner portion 335a of the disc 335 constitutes a short cylindrical sleeve which extends toward the housing 313a and is centered by a similar axially extending relatively short cylindrical sleeve 349a constituting the radially outermost portion of a washer 349 which is affixed to the housing 313a and an annular component 363 by rivets 352 (one shown in FIG. 7). The radially extending major portion 349b of the washer 349 serves to reinforce the housing 313a of the turbine 313. The aforementioned annular component 363 is clamped between the portion 313b of the housing 313b and the radially extending portion 349b of the washer 349. The radial portion 349b of the washer 349 can constitute a circumferentially complete part or it can comprise a plurality of neighboring radially extending sections or lugs.

A radially extending axial friction bearing 372 of suitable plastic material is installed between the radially inner portion 307a of the shell 307 and the radially inner portion 349b of the washer 349. The bearing 372 and, if necessary, the washer 349 (and, if necessary, the radially inner portion 307a of the shell 307) are provided with radial passages which can be constituted by radial channels established in response to axial deformation of the respective parts. Such passages serve to permit free circulation of oil or another hydraulic fluid which fills the torque converter including the turbine 313. The hydraulic fluid should be free to circulate in the space between the shell 307 and the washer 349.

In order to prevent rotation of the disc 335 relative to the hub 314, the annular component 363 is provided with male detent members 362 in the form of suitably deformed portions bulging from the general plane of the component 363 in a direction toward the radially extending radially inner portion 307a of the casing 307. The disc 335 has complementary detent members 365 formed by surfaces flanking radially extending grooves each of which receives one of the male detent members 362 on the annular component 363. As can be readily seen in FIG. 7, the cooperating male and female detent members 362, 365 enable the disc 335 to act not unlike a piston or plunger, i.e., the disc 335 is movable axially of the hub 314 toward and away from the fixedly mounted disc 336 but is invariably held against rotation relative to the housing 313a of the turbine 313.

The male detent members 362 can be obtained by providing the component 363 with pairs of radially extending slits and by pushing the strip-shaped portions between the pairs of slits axially of the component 363.

Figure 8:
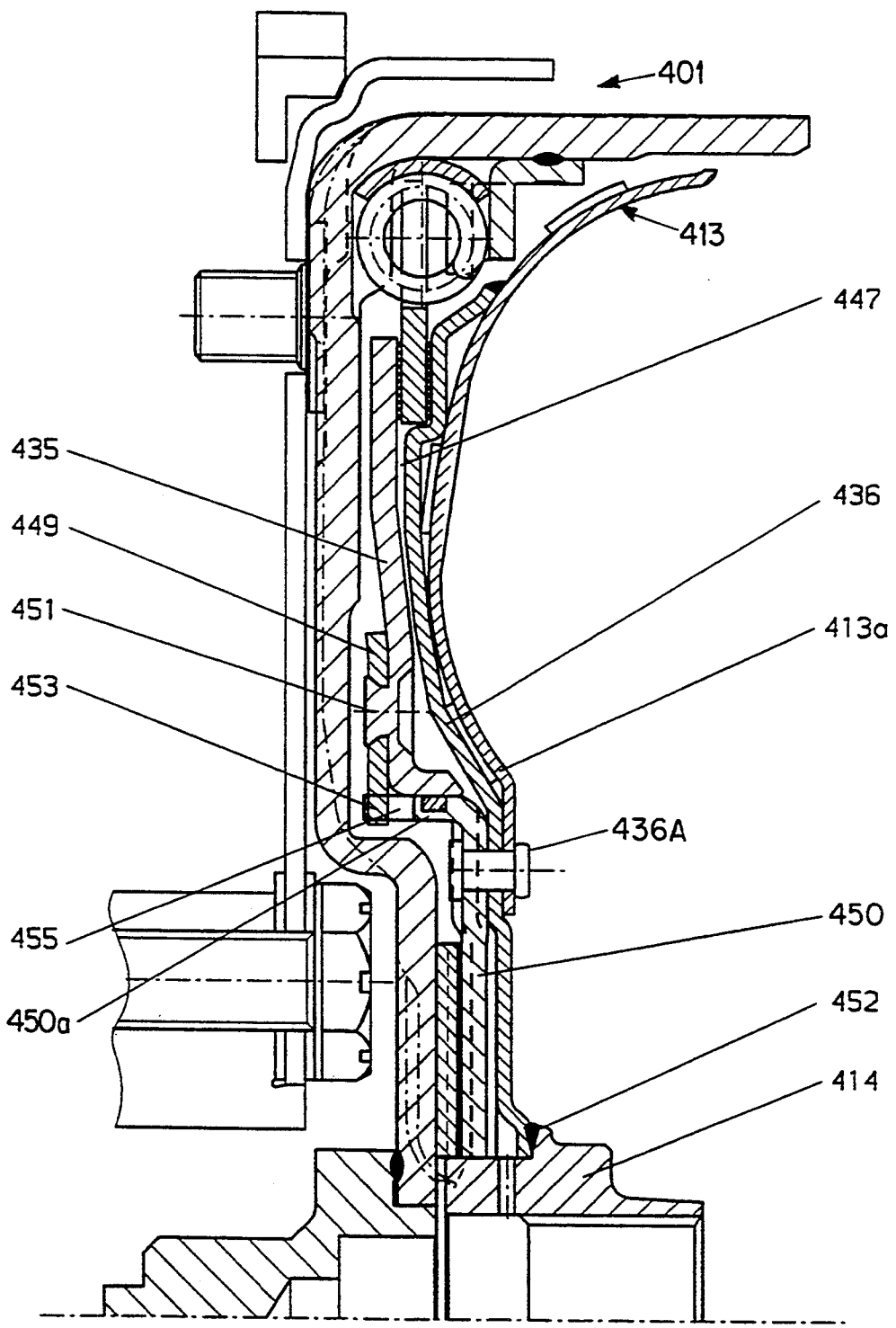
FIG. 8 is a similar fragmentary axial sectional view of a fifth apparatus constituting a modification of the apparatus of FIG. 7.

If desired, the apparatus 301 can be modified to more closely resemble the apparatus 201 of FIG. 6. Thus, the apparatus 301 can be provided with a separately produced washer corresponding to the washer 236 of FIG. 6 to be affixed to the housing 313a and/or to the hub 314 so that the portion 313b of the apparatus 301 then merely serves to constitute a part of the housing 313b and to carry the component 363 and washer 349. The just outlined modification is embodied in the apparatus 401 of FIG. 8. The housing 413a of the turbine 413 in FIG. 8 does not extend all the way to the hub 414 but the disc 436 does. The radially innermost portion of the disc 436 is welded to the hub 414 at 452. The discs 435, 436 of the apparatus 401 cooperate to define an annular compartment 447 which is sealed from the surrounding area when the lock-up clutch including the discs 435, 436 is engaged. Rivets 436A (one shown) serve as a means for connecting the disc 436 to the housing 413a of the turbine 413.

The disc 436 serves as a means for supporting the housing 413a of the turbine 413, namely for securing such housing to the hub 414. Rivets 451 (one shown in FIG. 8) are provided to rigidly connect the disc 436 with a washer 449; these rivets are of one piece with the disc 435 and their heads extend into complementary sockets of the washer 449.

The radially inner portion of the washer 449 has radially inwardly extending projections 453 which are received in axially extending sockets or recesses 455 of the cylindrical sleeve-like portion 450a of the washer 450. The arrangement is preferably such that the projections 453 are received in the respective recesses 455 with minimal or no angular play but that the washer 449 (and hence the disc or piston 435) is free to move, within limits, in the axial direction of the washer 450 and disc 436.

Figure 9:
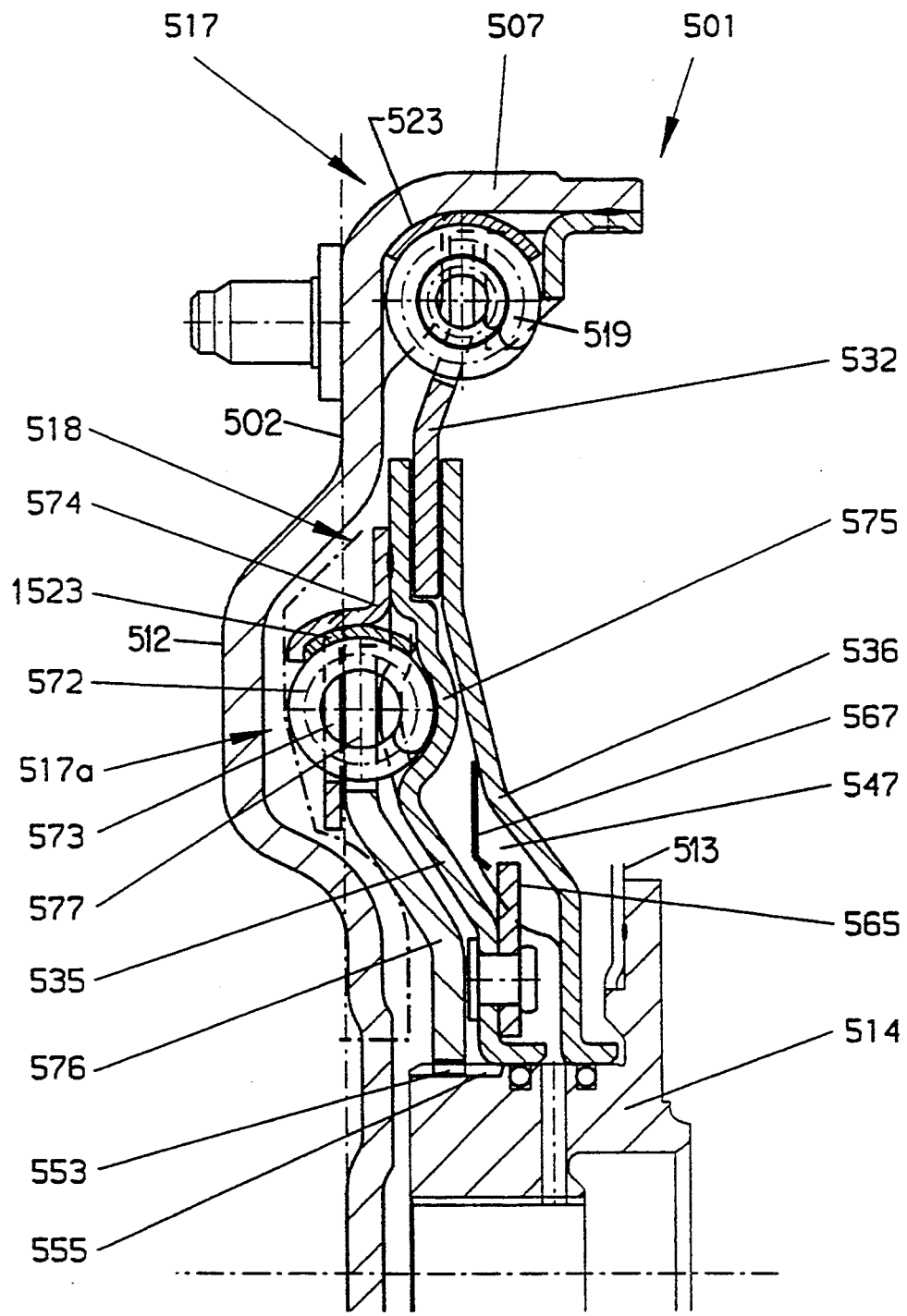
FIG. 9 is a fragmentary axial sectional view of a sixth apparatus with two dampers in series with each other and with the lock-up clutch.

The apparatus 501 of FIG. 9 differs from heretofore described apparatus 1, 101, 201, 301 and 401 in that the axially movable discs or pistons 535, 536 (which constitute or form part of the output member of the lock-up clutch 518) are free to perform certain angular movements relative to the hub 514. This is due to the provision of a second or secondary elastic damper 517a which operates between the discs 535, 536 on the one hand and the hub 514 on the other hand. The discs 535, 536 define an annular compartment 547 which is sealed when the clutch 518 is engaged, i.e., when the radially outer portions of these discs are in direct or indirect frictional engagement with the radially inner portion of the flange 532. Thus flange constitutes the input member of the clutch 518 and the output member of the primary or first damper 517. The clutch 518 operates in series with the dampers 517 and 517a. The damper 517 is optional; if this damper is omitted, the flange 532 is rigidly affixed to the shell 507 of the casing of the apparatus 501.

The radially inner portions of the discs 535, 536 constitute relatively short cylindrical sleeves which are axially movable along the adjacent cylindrical portion of the peripheral surface of the hub 514. Male detent members 565 which are riveted to the disc 535 cooperate with complementary female detent members on the disc 536 to confine these discs to axial movements relative to each other. The female detent members can constitute deformed portions of the disc 536, and such deformed portions extend into the compartment 547 to flank the male detent members 565. The manner in which the clutch 518 of FIG. 9 is to be engaged and disengaged is or can be the same as described with reference to the apparatus 1 of FIGS. 1 to 3.

The second damper 517a comprises energy storing elements in the form of arcuate coil springs 572 which are received in part in arcuate recesses 575 of the disc 535 and in part in the windows 573 of an annular component 574 rigid with the disc 535. The recesses 575 are defined by suitably deformed portions of the disc 535. In the apparatus 501 of FIG. 9, the annular component 574 is welded to the disc 535. The output member of the second damper 517a is a flange-like member 576 having a radially outer portion provided with projections or arms 577 extending between neighboring springs 572. The radially inner portion of the flange-like output member 576 is profiled (e.g., toothed) at 553 to mate with the complementary externally profiled (toothed) portion 555 of the hub 514. Thus, the member 576 is free to move axially of but cannot turn on the hub 514.

The apparatus 501 further comprises a wear-reducing arcuate liner 1523 for the energy storing elements 572. This liner is analogous to the liner 523 for the energy storing elements 519 of the damper 517 and cooperates with the radially outwardly adjacent portion of the annular component 574 to constitute therewith a confining portion at least for the radially outer portions of the energy storing elements 572.

The second damper 517a is disposed axially between the disc 535 and the radially extending portion of the shell 507. However, it is equally possible to install the second damper (such as the damper 517a of FIG. 9) in the annular compartment (such as 547). This could be achieved in a simple and inexpensive manner by modifying the configuration of the discs 535 and 536, namely these discs would have to be provided with arcuate recesses for the energy storing elements (such as 572) of the second damper. The thus modified discs 535, 536 would further comprise abutments corresponding to the abutments 24 and 26 in the apparatus 1 of FIGS. 1 to 3. Furthermore, the diameter of the central opening of the modified disc 536 would exceed the inner diameter of the central opening of the modified disc 535 (refer again to the apparatus 1 of FIG. 1), and the hub 514 would be provided with teeth or analogous profiled portions between the radially inner portions of the modified discs 535, 536 to be non-rotatably engaged by the internal teeth 553 of the output member 576.

A resilient annular component including a dished spring 567 is clamped between the discs 535, 536 and serves to yieldably urge these discs axially and away from each other, i.e., to disengage the clutch 518.

As already mentioned above, the clutch 518 of FIG. 9 is installed to operate in series with the dampers 517 and 517a. The output member 532 of the damper 517 transmits torque to the clutch 518, and the output means of this clutch transmits torque to the input means of the damper 517a.

The damper 517a of the apparatus 501 is installed between the radially extending part 512 of the casing 502 and the disc 535, and the disc 535 is disposed between the damper 517a and radially extending part 512 on the one hand, and the disc 536 on the other hand. The latter is adjacent the housing of the turbine 513, and such housing is welded or otherwise secured to the hub 514.

Figure 10:
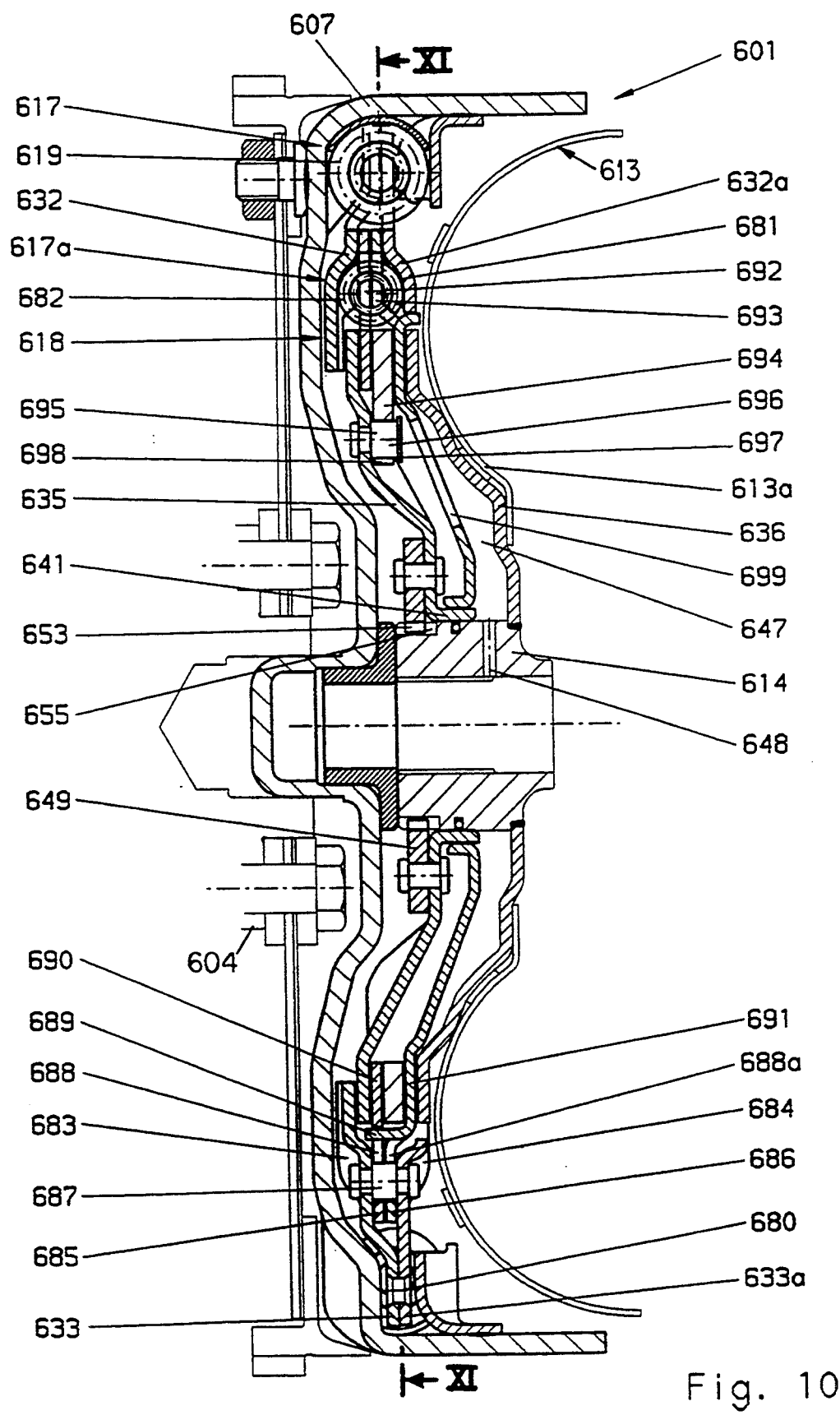
FIG. 10 is an axial sectional view of a seventh apparatus constituting a modification of the apparatus which is shown in FIG. 9.
Figure 11:
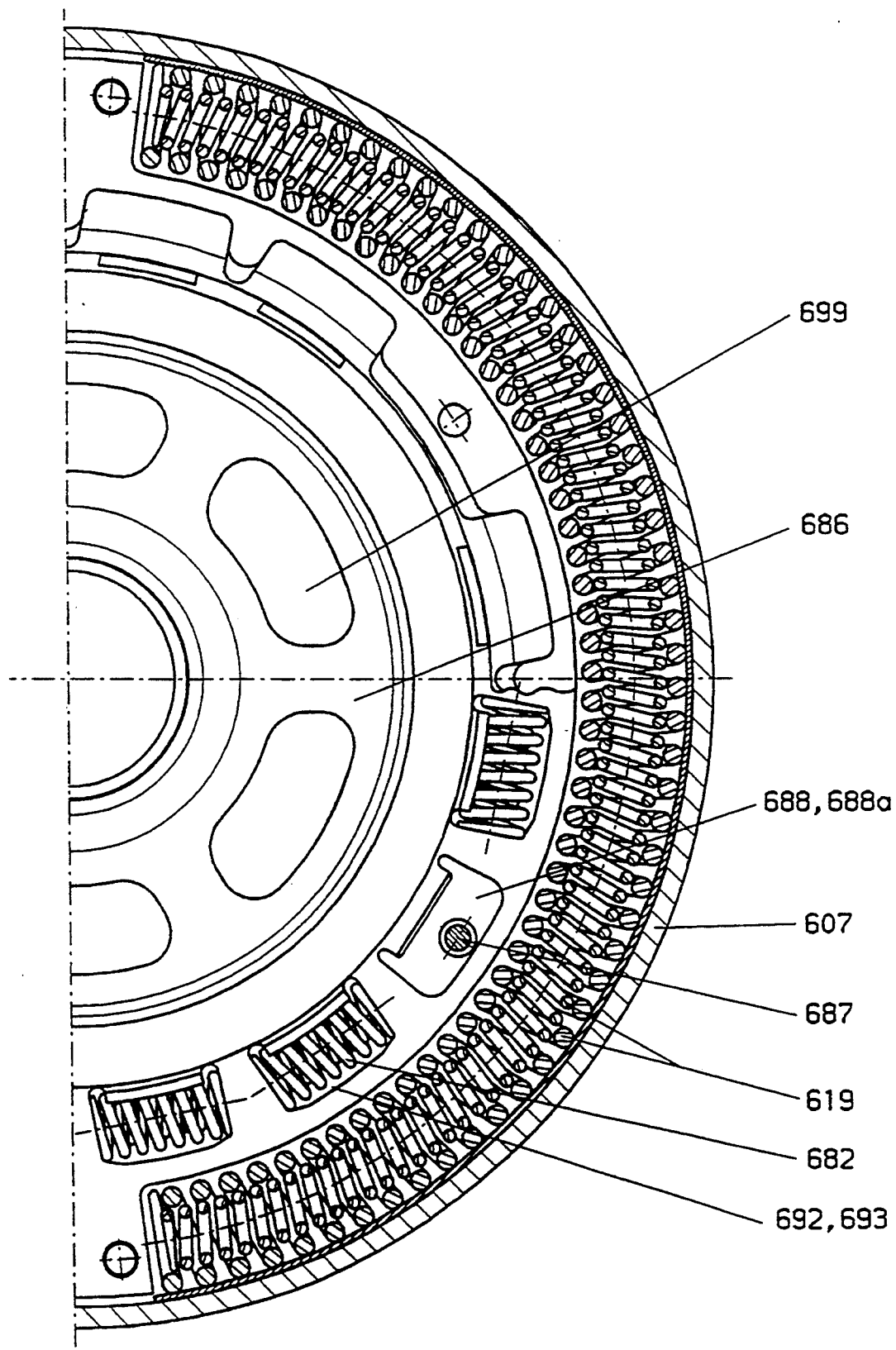
FIG. 11 is a fragmentary transverse sectional view substantially as seen in the direction of arrows from the line XI—XI in FIG. 10.

FIGS. 10 and 11 illustrate an apparatus 601 which also comprises a first or primary elastic damper 617 in series with a second or secondary elastic damper 617a. A difference between the apparatus 501 and 601 that the lock-up clutch 618 of the apparatus 601 is located downstream of the dampers 617, 617a (as seen in the direction of power flow from the input unit including the crankshaft 604) toward the output unit including the input shaft of the transmission.

The energy storing elements 619 of the damper 617 are confined in and are inwardly adjacent the radially outermost portion of the shell 607 (the same as described with reference to the apparatus 1). The output member of the damper 617 includes two discs 632, 632a having radially outwardly extending arms 633, 633a received between neighboring end portions of the adjacent energy storing elements 619. Each arm 633 is in register with an arm 633a, as seen in the axial direction of the apparatus 601, and each such pair of aligned arms 633, 633a is non-rotatably connected to each other by a rivet 680. The discs 632, 632a diverge from each other radially inwardly of their arms 633, 633a to form two annular chambers having different widths, as seen in the axial direction of the apparatus 601. The width of the annular chamber 681 which is nearer to the axis of the apparatus 601 exceeds the width of the other annular chamber.

The chamber 681 accommodates abutments 683, 684 for the arcuate energy storing elements 682 of the damper 617a, and such abutments are suitably deformed integral parts of the discs 632, 632a. The abutments 683, 684 have pockets which are located between the ends of the adjacent energy storing elements 682.

The output member of the damper 617a comprises two discs 685, 686 having portions disposed between pairs of axially aligned abutments 683, 684. The discs 685, 686 of the output member of the damper 617a constitute a composite input member of the clutch 618. As can be seen in the lower portion of FIG. 10, parts of the discs 685, 686 are rather snugly received between (and are thus held against axial movement by) the discs 632, 632a of the output member of the damper 617. Rivets 687 are provided to non-rotatably connect the discs 632, 632a to each other radially inwardly of the energy storing elements 619 of the damper 617. The rivets 687 constitute distancing elements which maintain the corresponding portions of the discs 632, 632a at a selected optimum distance from each other. The cylindrical central portions of the distancing elements or rivets 687 extend through openings 688, 688a (see particularly FIG. 11) of the discs 685, 686, respectively. The rivets 687 form an annulus having a diameter which equals or approximates that of the abutments 683 and 684.

The discs 685, 686 (i.e., the output member of the damper 617a and the input member of the clutch 618) are non-rotatably but axially movably coupled to each other. The coupling permits limited axial movements of the discs 685, 686 relative to each other and comprises projections or lugs 689 which are provided on the disc 686 radially outwardly of the clutch 618 at the radial level of the openings 688a. The lugs 689 are integral parts of the disc 686 and are bent in the axial direction to be received, at least substantially without angular play, in the cutouts or recesses 688 of the disc 685. Thus, the lugs 689 cooperate with the surfaces bounding the respective recesses or cutouts 688 to hold the discs 685, 686 against annular movement relative to each other but permit simple insertion of lugs into or their extraction from the aligned cutouts. The extent of axial movability of the discs 685, 686 relative to each other is determined by the adjacent axially spaced-apart portions of the discs 632, 632a.

The discs 685, 686 are respectively provided with arcuate or annular friction generating portions 690, 691 which can cooperate with the adjacent friction generating portions of an output member of the clutch 618. Still further, the discs 685, 686 are provided with recesses 692, 693 for the energy storing elements 682 of the damper 617a.

As can be seen in FIG. 11, the damper 617 can comprise two elongated arcuate energy storing elements 619 (only one shown). This renders it possible to achieve a low twisting or torsional ratio of between 2 and 15 Nm per degree. On the other hand, the damper 617a comprises a substantial number of relatively short straight or slightly arcuate energy storing elements 682 in order to establish a rather high twisting or torsional ratio of between 60 and 150 Nm per degree.

The disc 686 of the input member of the clutch 618 has a radially inner portion which is indirectly mounted on and centered by the hub 614. The arcuate or annular friction generating portions 690, 691 of the discs 685, 686 are disposed at opposite sides of a disc-shaped output member 694 in the form of a ring or lamella disposed in the compartment 647 between the discs 635 and 636. This ring is clamped by the discs 685, 686 when the clutch 618 is engaged. At least the disc 635 of the discs 635, 636 constitutes a piston which is movable axially of the apparatus 601 to engage or disengage the clutch 618. To this end, the radially inner portion of the disc 635 is centered and is axially movably and sealingly guided by the adjacent cylindrical portion of the peripheral surface of the hub 614. The radially inner portion of the disc 635 constitutes a relatively short cylindrical sleeve 641 which centers the radially innermost portion of the disc 686. The disc 636 of the apparatus 601 which is shown in FIGS. 10 and 11 is rigidly connected to the hub 614, and this disc serves to carry the housing 613a of the turbine 613. However, it is equally within the purview of the invention to modify the disc 636 so that it constitutes an axially movable piston, or to make the disc 636 an integral part of the housing 613a (refer to FIG. 7).

The ring 694 (i.e., the output member of the clutch 618) is centered by and is non-rotatably connected to the disc 635 with limited freedom of axial movement. Such connection is established by rivets 695 which are secured to the disc 635 and have axially parallel shanks 696 in the annular compartment 647. The free ends of the shanks 696 are provided with heads 697 which limit the extent of axial movability of the ring 694 relative to the disc 635. The shanks 696 extend through cutouts or apertures 698 which are provided in the internal surface of the ring 694.

The radially inner portion of the disc 686 is provided with an annulus of slots or openings 699 which are elongated in the circumferential direction (see FIG. 11).

The means for non-rotatably connecting the disc or piston 635 with the hub 614 comprises a washer 649 which has an internal profile (e.g., teeth) 653 mating with a complementary external profile (e.g., teeth) 655 of the hub 614. The washer 649 is rigidly secured (e.g., welded or riveted) to the disc 635.

The means for disengaging or opening the clutch 618 includes a radial bore or channel 648 which is provided in the hub 614 and serves to admit into the compartment 647 a pressurized hydraulic fluid (e.g., oil). Such admission of pressurized fluid via channel 648 takes place while the clutch 618 is engaged, i.e., while the compartment 647 is sealed from the surrounding atmosphere. This entails an axial movement of the disc 635 away from the disc 636 (the latter is welded to the hub 614) to thus permit disengagement of the discs 685, 686 from the ring 694, i.e., the input member 685, 686 and the output member 694 of the clutch 618 are then free to perform a limited angular movement relative to each other. The extent of angular movability of the input and output members of the damper 617 relative to each other is determined by maximum compressibility of its energy storing elements 619. The compressibility of each element 619 is terminated when the convolutions of its coil springs abut each other so that each such spring acts not unlike a solid one-piece body.

The maximum deformability of the damper 617a is determined by its energy storing elements 682. Thus, such compressibility attains a maximum value when the convolutions of each element 682 actually touch each other, i.e., when each element 682 acts not unlike a solid one-piece body. Alternatively, the deformability of energy storing elements 682 can be limited by the rivets 687 if their shanks are designed to engage the surfaces bounding the openings 688 and/or 688a before the elements 682 are fully compressed. This can be readily achieved by appropriate dimensioning of the openings 688 and/or 688a.

The clutch 618 is designed to establish frictional engagement between four pairs of parts. Each pair includes a portion on the input member and a portion on the output member of the clutch 618. The advantages of such clutch were described hereinbefore.

Figure 12:
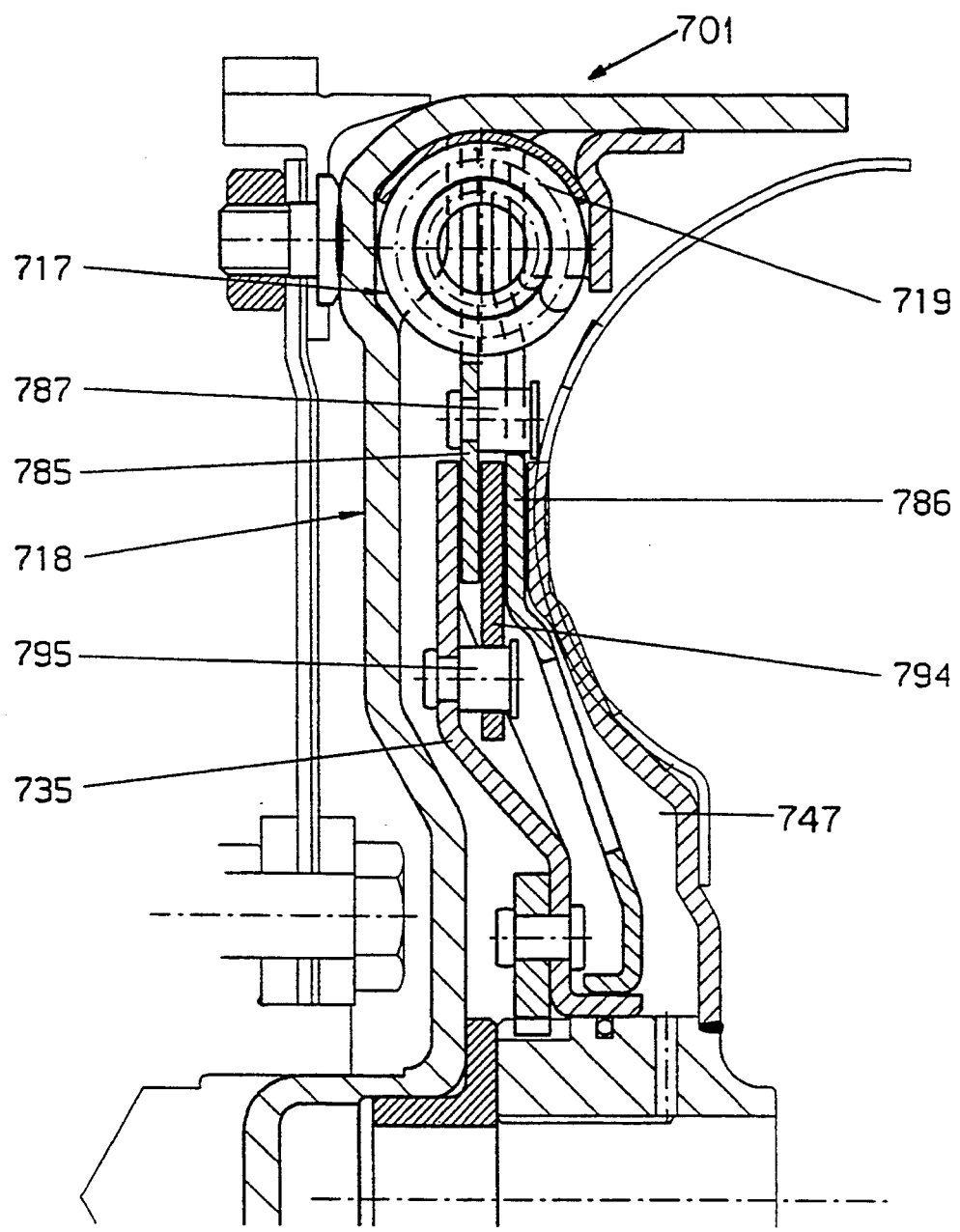
FIG. 12 is a fragmentary axial sectional view of an eighth apparatus.

The apparatus 701 of FIG. 12 differs from the apparatus 601 in that the second or secondary damper 617a is omitted and the discs 785, 786 of the input member of the lock-up clutch 718 directly engage the energy storing elements 719 of the damper 717. The radially outer portions of the discs 785, 786 comprise outwardly extending projections or arms which extend between neighboring energy storing elements 719 of the damper 717. The discs 785, 786 are axially movably but non-rotatably coupled to each other by rivets 787 (one shown in FIG. 12), and the disc 735 is non-rotatably but axially movably coupled to the ring 794 (output member of the clutch 718) by rivets 795 (one shown in FIG. 12). The extent of axial movability is determined by the enlarged portions or heads at the right-hand axial ends of the illustrated rivets 787 and 795, the same as described with reference to the rivet 695 which is shown in FIG. 10.

Figure 13:
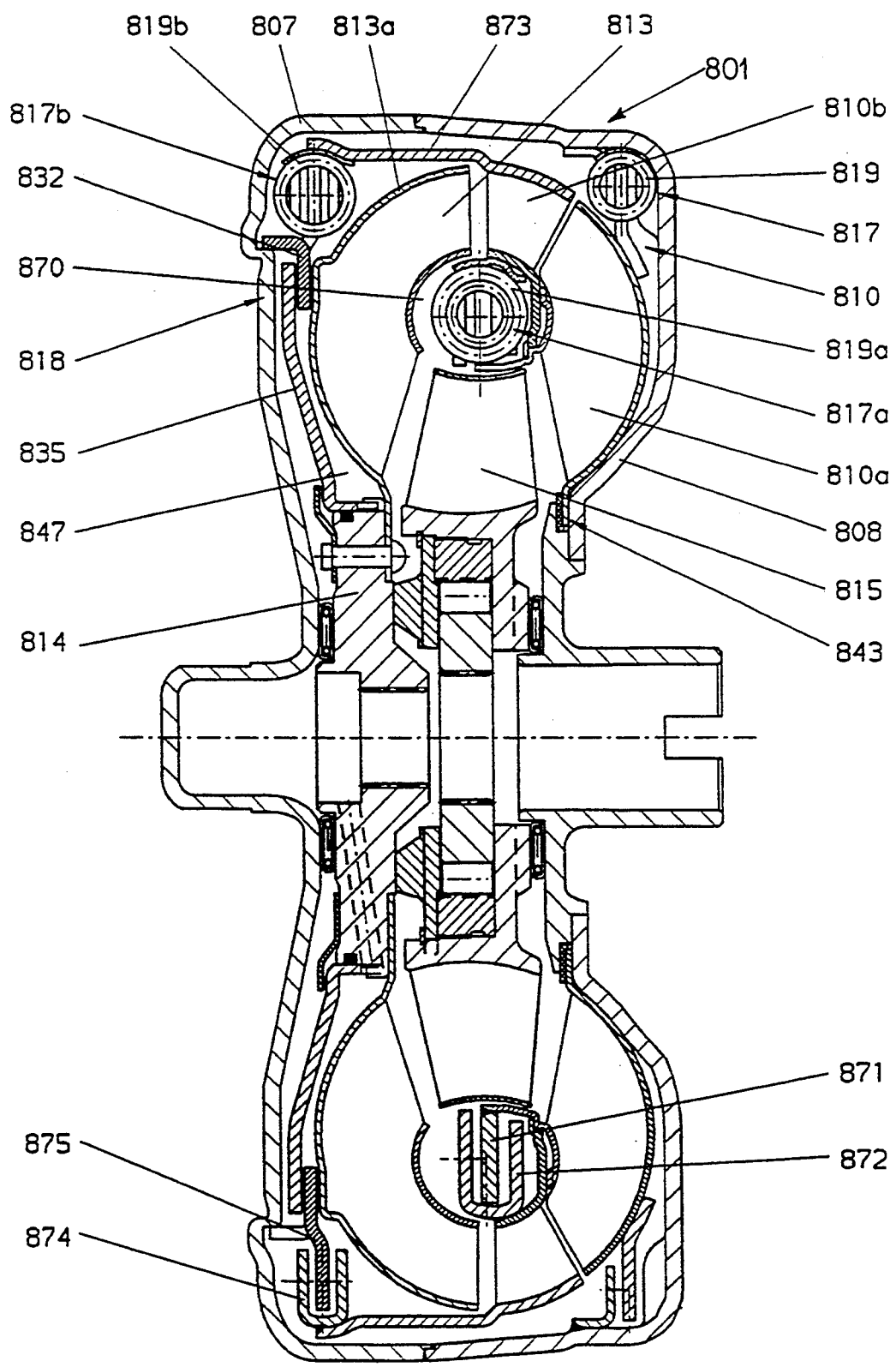
FIG. 13 is an axial sectional view of a ninth apparatus with three elastic dampers and a lock-up clutch in series with one of the dampers.

Referring to FIG. 13, there is shown an apparatus 801 which is a hydrokinetic torque converter and employs a lock-up clutch 818 whose construction and mode of operation can be the same as, or similar to, the construction and mode of operation of and of the heretofore described lock-up clutches 18 . . . 718. As can be seen in FIG. 13, one side of the annular compartment 847 of the clutch 818 is bounded by an axially movable disc or piston 835 which is non-rotatably carried by the hub 814 but is movable axially of the apparatus 801. The other side of the compartment 847 is bounded by the housing 813a of the turbine 813. The pump 810 of the apparatus 801 comprises at least two discrete annular sections including a main section 810a and an auxiliary section 810b. The main section 810a is rotatable relative to the casing including the shells 807 and 808, and this main section is turnable relative to the shell 808 to the extent determined by an elastic damper 817. The latter comprises arcuate energy storing elements 819 including coil springs which are installed in the corner between the axially and radially extending parts of the shell 808 in a manner identical with or similar to that described hereinbefore, e.g., in connection with the energy storing elements 19 of the damper 17. The difference is that the entire damper 817 is confined in the casing including the shells 807 and 808, i.e., radially outwardly, at the side facing toward the engine (not shown but located to the left, as viewed in FIG. 13) and at the side facing away from the engine. The main section 810a of the pump 810 is centered in the axial direction of the apparatus 801 by a friction bearing 843.

The auxiliary pump section 810b is disposed radially outwardly of the main section 810a, and these sections are connected to each other by an elastic damper 817a. The latter is installed in the annular space or chamber 870 which is bounded by the housings of the pump sections 810a, 810b, by the housing of the turbine 813, and by the housing of the stator 815. The housings of the pump sections 810a, 810b are provided with abutments or stops 871, 872 which alternate with and can stress circumferentially extending arcuate energy storing elements 819a of the damper 817a.

In order to prevent rotation of the pump sections 810a, 810b relative to each other when the composite pump 810 of the apparatus 801 is in use, the elastic damper 817a can be installed in stressed condition, i.e., its energy storing elements 819a can apply a force corresponding to the maximum driving torque of the main pump section 810a. The aforedescribed novel design of the pump 810 (i.e., the division of such pump into a main section 810a and an auxiliary section 810b) renders it possible to utilize the annular space or chamber 870 for confinement of at least one additional damper (817a).

The radially outer section 810b of the pump 810 is connected with the input member or flange 832 of the lock-up clutch 818 by a further damper 817b. The flange 832 further constitutes the output member of the elastic damper 817b. The latter is installed in the radially outermost portion of the casing including the shells 807, 808 adjacent the radially inwardly extending part of the shell 807, i.e., adjacent the engine. The pump section 810b comprises a sleeve-like axially disposed extension 873 which spacedly surrounds the turbine 813. The illustrated extension 873 is of one piece with the housing of the pump section 810b. That axial end of the extension 873 which is remote from the remaining part of the auxiliary pump section 810b is provided with abutments or stops 874 for the energy storing elements 819b of the damper 817b. The abutments 874 constitute radially inwardly extending U-shaped bodies (one shown in the lower left-hand corner of FIG. 13) each of which has two parallel legs and a web connecting the radially outer portions of the legs to each other. Each abutment 874 is welded or otherwise reliably affixed to the extension 873. Additional abutments or stops 875 for the energy storing elements 819b of the damper 817b are provided on (e.g., welded to) the output member or flange 832 and extend radially outwardly between neighboring energy storing elements 819b. Each abutment 875 can enter the space between the radially disposed legs of a U-shaped abutment 874 (refer again to the lower left-hand portion of FIG. 13).

The abutments or stops 871, 872 for the energy storing elements 819a of the damper 817a are similar or analogous to the just described abutments 874 and 875. The U-shaped abutments 872 are provided on the auxiliary pump section 810b, and the other abutments 871 constitute or resemble radially outwardly extending arms which are provided on (e.g., welded to) the casing of the main pump section 810a.

The dampers 817, 817a, 817b are installed upstream of the clutch 818, as seen in the direction of power flow from the engine to the input shaft of the transmission. Furthermore, the dampers 817, 817a, 817b operate in series with each other as well as with the clutch 818.

The apparatus 801 of FIG. 13 can be modified by rigidly connecting the main pump section 810a to the shell 807 of the casing including the shells 807, 808. This renders it possible to dispense with the damper 817. In addition to or in lieu of the just mentioned modification, the apparatus 801 can operate without the damper 817a; this merely necessitates the establishment of a rigid connection between the pump sections 810a, 810b or replacement of these sections with a one-piece pump.

Subdivision of the pump 810 into a plurality of sections contributes to more satisfactory utilization of the internal space of the hydraulic clutch which includes the pump 810, the turbine 813 and the stator 815. The utilization of a prestressed elastic damper 817a between the sections 810a, 810b of the composite pump 810 renders it possible to ensure that the damper 817a becomes effective only in response to the development of surges of torque which is being transmitted from the driving unit (i.e., from the part or parts which rotate the casing including the shells 807 and 808) to the driven unit (i.e., to the hub 814). This can be achieved by the simple expedient of stressing the energy storing elements 819a of the damper 817a to an extent corresponding to the maximum torque which can be transmitted from the engine to the transmission. Moreover, the just described design and stressing of the damper 817a and its energy storing elements 819a, as well as the provision of a composite pump 810, renders it possible to enhance the efficiency of the apparatus 801 because the sections 810a, 810b of the pump 810 cannot turn relative to each other in normal operation of the apparatus.

The damper 817b and the lock-up clutch 818 establish a force-locking or frictional connection between the pump section 810b and the hub 814 (i.e., the driven unit).

The improved apparatus is susceptible of many additional modifications. For example, the features of the apparatus 1 to 801 can be combined with each other in a number of ways to arrive at modified apparatus which are particularly suitable for utilization under certain sets of circumstances. In addition, at least some of the aforedescribed individual constituents or groups of constituents of the apparatus 1 to 801 constitute innovations which are novel and patentable per se. This applies particularly, but not exclusively, for various features and groups of features (such as dampers 817, 817a, 817b) which are embodied in the apparatus 801 of FIG. 13.

Reference may be had to commonly owned U.S. Pat. No. 4,986,398 granted Jan. 22, 1991 to Olsen for "Torque converter clutch" and to commonly owned U.S. Pat. No. 4,785,924 granted Nov. 22, 1988 to Jäckel for "Torque transmitting assembly". The patent to Jäckal describes another lock-up clutch which can be utilized in the apparatus of the present invention.

U.S. Pat. Nos. 4,768,633, 4,825,366, 4,827,805 and 4,858,500 disclose the mode of operation of lock-up clutches which can be utilized in the apparatus of the present invention. The disclosures of these patents are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transmitting force from a rotary driving unit to a rotary driven unit, comprising at least one rotary casing having a circumference and being connectable with the driving unit; and means for transmitting torque between said at least one casing and the driven unit, including at least one pump driven by said at least one casing, at least one turbine connectable with the driven unit and damper means including at least one elastic damper between said at least one casing and a part of the driven unit, said at least one casing having a substantially axially extending confining portion and said at least one damper comprising a plurality of energy storing elements acting at least in the circumferential direction of said at least one casing, said elements being elongated in said circumferential direction and being at least partially surrounded by said confining portion axially as well as circumferentially of said at least one casing and said elements bearing against said confining portion under the action of centrifugal force in response to rotation of said at least one casing, said torque transmitting means further comprising a lock-up clutch in series with said at least one damper.

2. The apparatus of claim 1, wherein said at least one turbine is non-rotatably connected with a hub which is connectable with the driven unit, said torque transmitting means further comprising at least one stator between said at least one pump and said at least one turbine.

3. The apparatus of claim 1, wherein said at least one damper further comprises an input member forming part of said at least one casing.

4. The apparatus of claim 3, wherein said input member includes integral abutments on said at least one casing.

5. The apparatus of claim 4, wherein said abutments constitute deformed portions of said at least one casing.

6. The apparatus of claim 1, wherein said energy storing elements include elongated springs having a circular cross-sectional outline, each of said springs having a length and a diameter and said length being between 6 and 20 times the diameter of the respective spring.

7. The apparatus of claim 6, wherein the length of each of said springs is between 8 and 14 times the diameter of the respective spring.

8. The apparatus of claim 1, wherein said energy storing elements include springs each of which extends circumferentially of said casing along an arc of between 90° and 175°.

9. The apparatus of claim 1, wherein said energy storing elements include preformed arcuate springs.

10. The apparatus of claim 9, wherein each of said preformed springs is shaped to retain its arcuate shape while installed within as well as upon withdrawal from and prior to insertion into said confining portion.

11. The apparatus of claim 1, wherein said confining portion includes an outer section and a liner between said outer section and said energy storing elements.

12. The apparatus of claim 11, wherein said liner includes at least one insert extending circumferentially of said casings adjacent one of said elements.

13. The apparatus of claim 1, wherein said at least one damper further comprises an input member having abutments engaging said elements and provided on said confining portion.

14. The apparatus of claim 13, wherein said abutments include abutments which are affixed to said confining portion.

15. The apparatus of claim 13, wherein said abutments include abutments which are integral with said at least one casing and alternate with said elements in the circumferential direction of said casing.

16. The apparatus of claim 13, wherein said input member includes an annular component and said abutments include deformed portions forming part of said annular component and alternating with said elements in the circumferential direction of said casings.

17. The apparatus of claim 16, further comprising means for bonding said annular component to said confining portion.

18. The apparatus of claim 16, wherein said annular component and said at least one casing define an annular chamber for said elements.

19. The apparatus of claim 1, wherein said at least one damper comprises an output member including a substantially disc-shaped component having outwardly extending projections engaging said elements.

20. The apparatus of claim 19, wherein said projections include substantially radial arms which alternate with said elements in the circumferential direction of said casings.

21. The apparatus of claim 1, wherein said at least one damper includes an output member and said clutch includes an input member constituted by said output member.

22. The apparatus of claim 1, wherein said a lock-up clutch has an input member and two substantially disc-shaped output members flanking said input member, at least one of said output members being movable toward and away from the other of said output members to thereby respectively engage and disengage said clutch.

23. The apparatus of claim 22, wherein said output members define an at least substantially annular compartment which is sealed in the engaged condition of said clutch.

24. The apparatus of claim 22, wherein at least one of said output members includes means for centering said input member.

25. The apparatus of claim 22, wherein said input member comprises at least one friction lining which is contacted by at least one of said output members in engaged condition of said clutch.

26. The apparatus of claim 25, wherein said clutch further comprises a supply of hydraulic fluid which is confined in said compartment in the engaged condition of said clutch and is free to flow into and from said compartment along said at least one lining in disengaged condition of said clutch.

27. The apparatus of claim 22, wherein said at least one output member is a reciprocable piston.

28. The apparatus of claim 22, wherein each of said output members is a reciprocable piston.

29. The apparatus of claim 1, wherein said lock-up clutch has a piston-like output member movable axially of and sealingly engaging a hub which is connectable with the driven unit.

30. The apparatus of claim 1, wherein said at least one casing comprises a substantially radially extending part which is spaced apart from said at least one turbine in the axial direction of a hub connectable with the driven unit, said lock-up clutch having two output members disposed between said substantially radially extending part and said at least one turbine.

31. The apparatus of claim 1, wherein said lock-up clutch has an input member connected with an output member of said at least one damper, two substantially disc-shaped output members defining an annular fluid-containing compartment, and means for non-rotatably connecting one of said output members to a hub which is connectable with the driven unit.

32. The apparatus of claim 31, further comprising means for non-rotatably connecting the other of said output members to said hub, at least one of said output members being movable axially of said hub.

33. The apparatus of claim 1, wherein said lock-up clutch has two substantially disc-shaped output members movable axially of said driven unit.

34. The apparatus of claim 1, wherein said lock-up clutch has a plurality of substantially disc-shaped output members and means for preventing rotation of said output members relative to each other.

35. The apparatus of claim 1, wherein said lock-up clutch has a plurality of output members and means for coupling said output members to each other with limited freedom of movement of at least one of said members relative to another of said members in the axial direction of a hub which is connectable with the driven unit.

36. The apparatus of claim 35, wherein said coupling means includes means for connecting said output members to each other by snap action.

37. The apparatus of claim 35, wherein said coupling means comprises a bayonet mount.

38. The apparatus of claim 1, wherein said lock-up clutch has input means receiving torque from said at least one damper.

39. The apparatus of claim 1, wherein said damper means comprises a plurality of elastic dampers, said lock-up clutch being in series with said plurality of dampers.

40. The apparatus of claim 39, wherein said dampers include said at least one damper having output means which transmits torque to said clutch, and a second damper having input means which receives torque from said clutch.

41. The apparatus of claim 1, wherein said casing includes a part which is adjacent said driving unit and said lock-up clutch has a first output member adjacent said at least one turbine and a second output member between said first output member and said part of said casing, said at least one damper being disposed between said part and said second output member.

42. The apparatus of claim 1, wherein said casing includes a part which is adjacent said driving unit and said lock-up clutch has a first output member adjacent said turbine and a second output member between said part and said first output member, said damper means including a second elastic damper between said part and said second output member.

43. The apparatus of claim 1, wherein said lock-up clutch has two substantially disc-shaped input members and output means including a lamella adjacent one of said input members and means for biasing said lamella and said one input member against each other to thus engage said clutch.

44. The apparatus of claim 43, wherein said biasing means comprises two second disc-shaped members at least one of which is movable axially of said hub toward and away from the other thereof, said second members defining an annular fluid-receiving compartment for said lamella and said one input member.

45. The apparatus of claim 44, further comprising means for connecting said lamella to one of said second members.

46. The apparatus of claim 44, further comprising means for non-rotatably connecting said input members to each other with predetermined freedom of axial movement relative to one another.

47. The apparatus of claim 1, wherein said lock-up clutch has at least one substantially disc-shaped input member including abutments for the energy storing elements of said at least one damper.

48. The apparatus of claim 1, wherein said lock-up clutch has at least one substantially disc-shaped input member, said damper means including a second elastic damper having energy storing elements and said at least one input member having portions engaging the energy storing elements of said second damper.

49. The apparatus of claim 1, wherein said torque transmitting means further comprises a lock-up clutch having at least one substantially disc-shaped input member and two substantially disc-shaped output members defining an annular fluid-containing compartment for said at least one input member, one of said output members having means for centering said at least one input member.

50. The apparatus of claim 1, wherein said at least one damper includes input means connected with said casing and output means connected with said pump.

51. The apparatus of claim 1, wherein said pump includes a plurality of sections and said at least one damper includes input means connected with one of said sections and output means connected with another of said sections.

52. The apparatus of claim 51, wherein said energy storing elements are prestressed.

53. The apparatus of claim 51, wherein said sections of said at least one pump include first housings and said at least one turbine has a second housing, said first and second housings defining an annular chamber for said at least one damper.

54. The apparatus of claim 1, wherein said at least one pump includes a first section and a second section, said damper means further including a second damper having input means connected with said first section and output means connected with said second section.

55. The apparatus of claim 54, wherein said sections include first housings and said at least one turbine has a second housing, said housings defining an annular chamber and said second damper being disposed in said chamber.

56. The apparatus of claim 54, wherein said lock-up clutch has means for force-lockingly connecting one of said sections with the driven unit.

57. Apparatus for transmitting force from a rotary driving unit to a rotary driven unit, comprising a lock-up clutch having two coaxial rotary output members defining an annular fluid-containing compartment, at least one of said output members being movable axially toward and away from the other of said output members; and a rotary input member disposed between said output members, said members cooperating to seal said compartment in response to movement of said at least one output member toward said other output member to thus engage said clutch.

58. Apparatus for transmitting force from a rotary driving unit to a rotary driven unit, comprising a hydraulic clutch including a composite pump having a first rotary section and a second rotary section; a lock-up clutch; and an elastic damper connecting one of said sections with said lock-up clutch.

59. Apparatus for transmitting force from a rotary driving unit to a rotary driven unit, comprising at least one rotary casing having a circumference and being connectable with the driving unit; and means for transmitting torque between said at least one casing and the driven unit, including a rotary hub connectable with the driven unit, at least one pump, at least one turbine and damper means including at least one elastic damper between said at least one casing and said hub, said at least one casing having a substantially axially extending confining portion and said at least one damper comprising a plurality of energy storing elements acting at least in the circumferential direction of said at least one casing, said elements being at least partially surrounded by and bearing against said confining portion under the action of centrifugal force in response to rotation of said at least one casing, said torque transmitting means further comprising a lock-up clutch having an input member and two substantially disc-shaped output members flanking said input member, at least one of said output members being movable toward and away from the other of said output members to thereby respectively engage and disengage said clutch, one of said output members forming part of said at least one turbine.

60. Apparatus for transmitting force from a rotary driving unit to a rotary driven unit, comprising at least one rotary casing having a circumference and being connectable with the driving unit; and means for transmitting torque between said at least one casing and the driven unit, including a rotary hub connectable with the driven unit, at least one pump, at least one turbine and damper means including at least one elastic damper between said at least one casing and said hub, said at least one casing having a substantially axially extending confining portion and said at least one damper comprising a plurality of energy storing elements acting at least in the circumferential direction of said at least one casing, said elements being at least partially surrounded by and bearing against said confining portion under the action of centrifugal force in response to rotation of said at least one casing, said torque transmitting means further comprising a lock-up clutch having an input member and two substantially disc-shaped output members flanking said input member, at least one of said output members being movable toward and away from the other of said output members to thereby respectively engage and disengage said clutch and further comprising means for connecting one of said output members to said at least one turbine.

61. Torque transmitting apparatus comprising a hydraulic clutch including at least one rotary casing having a circumference and being connectable with a driving unit, a pump driven by and installed in said at least one casing, at least one turbine installed in said at least one casing and connectable with an input component of a driven unit, at least one elastic damper installed between said at least one casing and a part of the driven unit and including energy storing elements acting in the circumferential direction of said at least one casing, and a lock-up clutch connected in series with said at least one damper and installed between said at least one damper and the driven unit, said at least one damper having a first diameter and said lock-up clutch having a second diameter smaller than said first diameter.

62. Torque transmitting apparatus comprising a hydraulic clutch including at least one rotary casing having a circumference and being connectable with a driving unit, a pump driven by and installed in said at least one casing, at least one turbine installed in said at least one casing and connectable with an input component of a driven unit, and at least one engageable and disengageable lock-up clutch in a power train between said at least one casing and the driven unit, said at least one lock-up clutch including an input element driven by said casing and two substantially disc-shaped members flanking said input element and movable relative to each other axially of said at least one casing to clamp said input element, said members defining at least one annular compartment which is at least substantially sealed in engaged condition of said lock-up clutch, said members being disposed axially between a wall of said at least one casing and said pump.

63. The apparatus of claim 62, wherein at least one of said members includes means for centering said input element.

64. The apparatus of claim 62, wherein said input element comprises at least one friction lining which is contacted by at least one of said members in engaged condition of said lock-up clutch.

65. The apparatus of claim 64, wherein said lock-up clutch further comprises a supply of hydraulic fluid which is confined in said compartment in the engaged condition of said lock-up clutch and is free to flow into and from said compartment along said at least one lining in disengaged condition of said lock-up clutch.

66. The apparatus of claim 62, wherein one of said members forms part of said at least one turbine.

67. The apparatus of claim 62, further comprising means for connecting one of said members to said at least one turbine.

68. The apparatus of claim 62, wherein one of said members is a reciprocable piston.

69. The apparatus of claim 62, wherein each of said members is a reciprocable piston.

70. The apparatus of claim 62, wherein one of said members is movable axially of and sealingly engages a hub which is connectable with the driven unit.

71. The apparatus of claim 62, wherein said wall is spaced apart from said at least one turbine in the axial direction of a hub connectable with the driven unit.

72. The apparatus of claim 62, wherein said input element is connected with an output member of a damper which is installed between the driving and driven units, and further comprising means for non-rotatably connecting one of said substantially disc-shaped members to a hub which is connectable with the driven unit.

73. The apparatus of claim 72, further comprising means for non-rotatably connecting the other of said substantially disc-shaped members to said hub, at least one of said substantially disc-shaped members being movable axially of the hub.

74. The apparatus of claim 62, wherein said members are movable axially of the driven unit.

75. The apparatus of claim 62, wherein said lock-up clutch further comprises means for preventing rotation of said members relative to each other.

76. The apparatus of claim 62, wherein said lock-up clutch further comprises means for coupling said members to each other with limited freedom of movement of at least one of said members relative to the other of said members in the axial direction of a hub which is connectable with the driven unit.

77. The apparatus of claim 76, wherein said coupling means includes means for connecting said members to each other by snap action.

78. The apparatus of claim 76, wherein said coupling means comprises a bayonet mount.

79. The apparatus of claim 62, wherein said input element receives torque from at least one damper which is interposed between the driving and driven units.

* * * * *